US010812526B2

(12) United States Patent
Apelewicz et al.

(10) Patent No.: US 10,812,526 B2
(45) Date of Patent: Oct. 20, 2020

(54) MOVING TARGET DEFENSE FOR SECURING INTERNET OF THINGS (IOT)

(71) Applicant: Caligo Systems Ltd., Zur Yigal (IL)

(72) Inventors: Tuvia Apelewicz, Raanana (IL); Ziv Nuss, Zur Yigal (IL)

(73) Assignee: Caligo Systems Ltd., Zur Yigal (IL)

( * ) Notice: Subject to any disclaimer, the term of this patent is extended or adjusted under 35 U.S.C. 154(b) by 0 days.

(21) Appl. No.: 15/959,957

(22) Filed: Apr. 23, 2018

(65) Prior Publication Data

US 2018/0309786 A1    Oct. 25, 2018

Related U.S. Application Data

(60) Provisional application No. 62/489,212, filed on Apr. 24, 2017.

(51) Int. Cl.
| | |
|---|---|
| H04L 29/06 | (2006.01) |
| H04L 29/08 | (2006.01) |
| H04W 12/04 | (2009.01) |
| H04L 9/08 | (2006.01) |
| H04L 9/06 | (2006.01) |
| H04W 4/70 | (2018.01) |

(52) U.S. Cl.
CPC ........ H04L 63/1466 (2013.01); H04L 9/0618 (2013.01); H04L 9/0861 (2013.01); H04L 9/0869 (2013.01); H04L 9/0872 (2013.01); H04L 63/1416 (2013.01); H04L 67/12 (2013.01); H04W 4/70 (2018.02); H04W 12/04 (2013.01); H04L 63/0428 (2013.01); H04L 63/083 (2013.01)

(58) Field of Classification Search
CPC . H04L 63/1466; H04L 9/0872; H04L 9/0618; H04L 9/0869; H04L 63/1416; H04L 9/0861; H04L 67/12; H04L 63/083; H04L 63/0428; H04W 4/70; H04W 12/04; H04W 12/0401
See application file for complete search history.

(56) References Cited

U.S. PATENT DOCUMENTS

| | | | | |
|---|---|---|---|---|
| 7,664,855 B1 * | 2/2010 | Freed | ................... | H04L 63/1466 709/225 |
| 2006/0236370 A1 * | 10/2006 | John | ................... | H04L 61/1523 726/1 |
| 2014/0244794 A1 * | 8/2014 | Nakadai | ................ | H04L 67/104 709/217 |
| 2015/0058967 A1 * | 2/2015 | Ringdahl | ............ | H04L 63/0254 726/11 |
| 2016/0329965 A1 * | 11/2016 | Cook | ....................... | H04L 67/02 |
| 2017/0251111 A1 * | 8/2017 | Sood | ....................... | H04W 4/24 |

* cited by examiner

*Primary Examiner* — Meng Li
(74) *Attorney, Agent, or Firm* — The IP Law Firm of Guy Levi, LLC

(57) ABSTRACT

The disclosure relates to systems, methods and devices for secure routing and encrypting of network data streams passing through a network switch and connected IoT devices. Specifically, the disclosure relates to systems, computer-readable media and methods for securing IoT based devices using moving target defense by periodically generating, and providing randomized port identifiers that are valid for a limited period.

19 Claims, 17 Drawing Sheets

IoT side originate/MU side terminate

MU side originate/IoT side terminate

MOVING TARGET DEFENSE FOR SECURING INTERNET OF THINGS (IOT)

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever

BACKGROUND

The present disclosure relates generally to internet of things (IoT) technology, and more particularly to systems, computer-readable media and methods for securing IoT based devices using moving target defense. Embodiments of the present disclosure generally relate to improvements to computing devices and, more specifically, to cybersecurity in, for example, supervisory control and data acquisition environment and networks.

With more than 20 B IoT devices connected to the internet today, and 50 B predicted by 2020, the weakest link in cloud security is not dependent on its architecture or advanced cloud security systems, but on the enormous amount of remote devices with access to cloud resources. Those weakly secured devices, if at all, are being used more and more by hackers to generate increasing damages to different types of organizations. DDOS (Distributed Denial of Service) attacks, such as the one that caused Twitter and Netflix go down for almost an entire day in October 2016 (Mirai), or attacks on connected cars, such as the one in San Francisco on a Jeep Cherokee in August 2015, which caused it to lose control over the breaking system, demonstrate the substantial risks associated with IoT devices and appliances that are increasingly becoming a fundamental part of our lives. Smart Cities and autonomous cars are just two examples of where the IoT ecosystem is heading, and the potential for damages is critical. There is no doubt that one of the most important challenges of the cyber security industry is to effectively protect IoT systems.

Internet-connected devices can enable seamless connections among people, networks, and physical services. Network-connected devices are already becoming ubiquitous in, and even essential to, many aspects of day-to-day life, from fitness trackers, pacemakers, and cars, to the control systems that deliver water and power to our homes with electricity and gas. Moreover, the expansion of connected IoT devices is occurring by leveraging expansion of IP addresses through carriers' deployment of IPv6, moving Internet addresses from a limited resource to a new platform without almost no restrictions.

However, the vast majority of connected IoT devices do not: enforce strong passwords, use mutual authentication, or protected accounts against brute-force attacks. Furthermore, a large portion of the available mobile apps used to control connected IoT devices, do not use Secure Sockets Layer (SSL) to encrypt communications to the cloud.

In addition, connected IoT devices rely on microcontrollers with limited memory and computational power, which can make it impractical to implement approaches designed for powerful computers, thus requiring constrained IoT devices to be hidden behind secure gateways These and other shortcomings of the current state of affairs are addressed by the following disclosure, figures and claims.

SUMMARY

Disclosed, in various embodiments, are systems, computer-readable media and methods for securing IoT based devices using moving target defense.

In an embodiment provided herein is a system implementing a moving target defense (MTD) against a malicious port scanning, spoofing attack, replay attack, or their combination, the system comprising: an edge network switch communicatively coupled to a network; a backend management server in communication with a non-volatile memory having stored thereon a set of executable instructions, that, when executed by a processor, cause the processor to periodically randomize a temporarily valid port identifier, each port identifier associated with an internal port identifier; the processor communicatively coupled to the edge network switch and the backend management server; and a IoT gateway having a plurality of ports thereon in communication with the edge network switch, each port associated with a connected Internet of Things (IoT) device, wherein the instructions, when executed, further cause the processor to: via the edge network switch, receive a request from a request originator for data from a connected device; select the temporarily randomized port identifier; and send the periodically randomized and temporarily valid port identifier to the request originator.

In another embodiment, provided herein is a method of providing secure network communication for plurality of connected internet of things (IoT) devices, the method implemented on a system comprising: an edge network switch communicatively coupled to a network; a backend management server in communication with a non-volatile memory having stored thereon a set of executable instructions, that, when executed by a processor, cause the processor to periodically randomize a temporarily valid port identifier, each temporarily valid port identifier associated with an internal port identifier and a port number; the processor communicatively coupled to the edge network switch and the backend management server; and a IoT gateway having a plurality of ports thereon in communication with the edge network switch, each port associated with a connected Internet of Things (IoT) device, wherein the instructions, when executed, further cause the processor to: via the edge network switch, receive a request for data from a connected device, select the randomized port identifier, and send the periodically randomized and temporarily valid port identifier to the request, the method comprising: using the backend management server, periodically generating a temporarily valid randomized identification for a port associated with a connected IoT device; and upon receiving authenticated communication request between a user and the connected device that specify the port associated with the connected IoT device, and using a temporarily valid scrambling key, encrypting the data communicated from the device to the user.

In yet another embodiment, provided herein is a processor readable medium with a set of executable instructions, that, when executed by the processor, cause the processor to periodically randomize a temporarily valid port identifier, each temporarily valid port identifier associated with an internal port identifier and a port number.

These and other features of systems, computer-readable media and methods for securing IoT based devices using moving target defense (MTD), will become apparent from the following detailed description when read in conjunction with the figures and examples, which are exemplary, not limiting.

BRIEF DESCRIPTION OF THE FIGURES

For a better understanding of the systems, computer-readable media and methods for securing IoT based devices using moving target defense, with regard to the embodiments thereof, reference is made to the accompanying examples and figures, in which.

DETAILED DESCRIPTION

Provided herein are embodiments of systems, computer-readable media and methods for securing IoT based devices using moving target defense.

Figure 7:
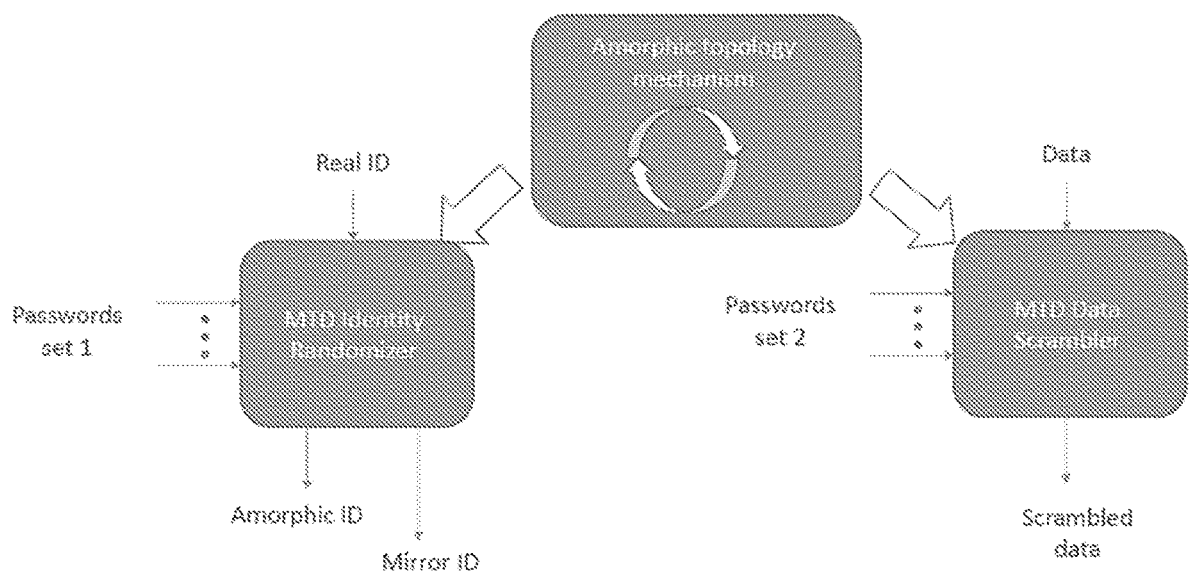
FIG. 7, is a schematic illustrating security system components.

As illustrated in FIG. 7, the system is an integrated system of a highly robust, scalable and cost effective security solution for IoT systems, which uses a multi-layer (e.g., OSI L2/L3/L4) network based solution which combines amorphic architecture together with a set of highly secure cryptographic algorithms for selective data scrambling, implementing Moving Target Defense (MTD) concepts. The system's end-to-end network solution can thus provide a cost effective security shield with extensive coverage for many types of IoT applications, devices and use cases. The provided technology can enable ISPs and IoT Application Providers to deliver security as a service to their IoT customers including protection from web based as well as local based attacks.

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Figure 2:
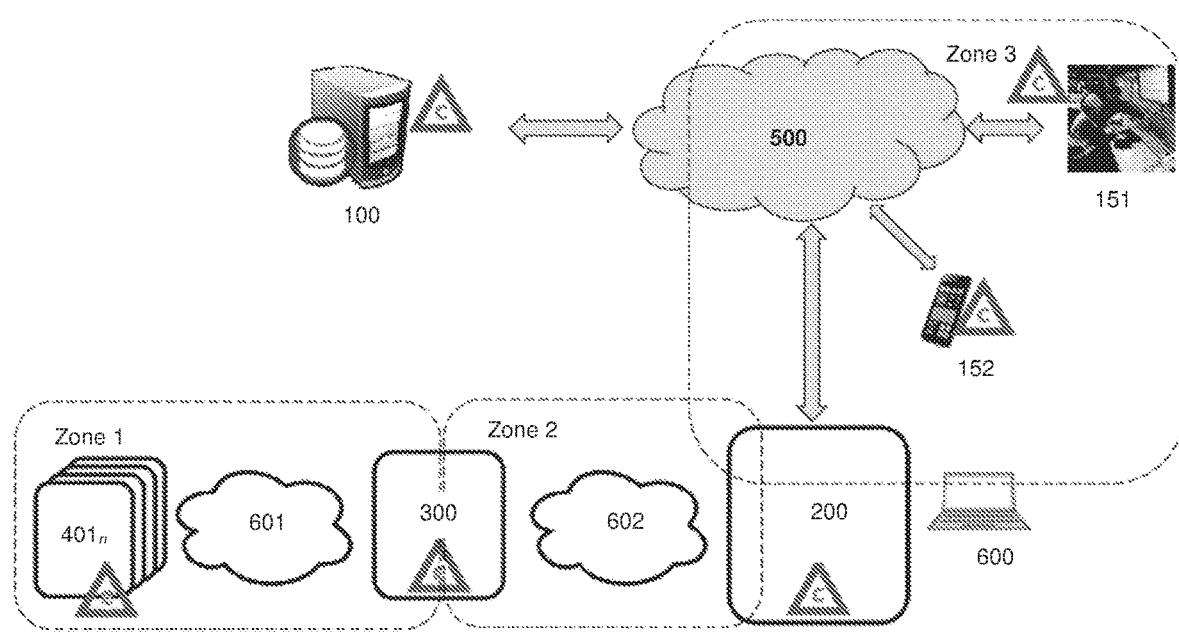
FIG. 2, Illustrates zones for deployment of the MTD system.

Turning now to FIG. 2, illustrating embodiments of the network junctions where the system described and claimed can be deployed. Zone 1, can be comprised of plurality of connected edge IoT devices $401_n$, proximity network 601 and gateway server 300 (defining IoT node). Proximity network 601 can be, for example, Ethernet, Wi-Fi, or similar data-link layer (OSI L2) communication protocols (e.g., 802.15.4, XBee). It is noted, that communication over the proximity network in Zone 1, does not necessarily leave Zone 1 and can be contained entirely among the plurality of connected edge IoT devices $401_n$. To properly route data communication the media access control (MAC) sublayer can be used, whereby each of the plurality of connected edge IoT devices $401_n$ (as does any other physical device in proximity network 601), has its own unique MAC address. The transmission comprising the frame that specifies the physical MAC address of both the sender and the recipient can be used in the methods described herein to create a temporarily valid, randomly generated identifier for each of the plurality of connected edge IoT devices $401_n$, by generating a MAC address table. Accordingly, the system can be deployed on a node level.

The systems described and claimed, can also be deployed in Zone 2, which, in an embodiment, can be comprised of one or more gateway server(s) 300, each gateway server 300 with their own plurality of connected edge IoT devices $401_n$. Also available in Zone 2, is edge network switch 200 and Backhaul network 602. In Zone 2, the systems and methods described herein can be used to generate both a table of temporarily valid, randomly generated MAC and/or IP address identifier for each of the plurality of connected edge IoT devices $401_n$, and/or for the MAC and/or IP address of gateway server(s) 300. The randomly generated address table can be used in conjunction with backhaul network 602, and be directed to IoT management platform with its information technology application. For example, in industrial application where a node can be a particular unit operation (e.g., fermenter, fluidized bed dryer, oven assembly line), controlled by a plant IoT management application 150, which can be deployed on edge network switch 200.

Similarly to Zone 1, Zone 2 network can also be for example, Ethernet, Wi-Fi, or similar data-link layer, and/or communication protocols used in the data link layer (and sublayers), as well as the network layer (OSI L3), for example LTE, LoRa, etc.

Figure 11A:
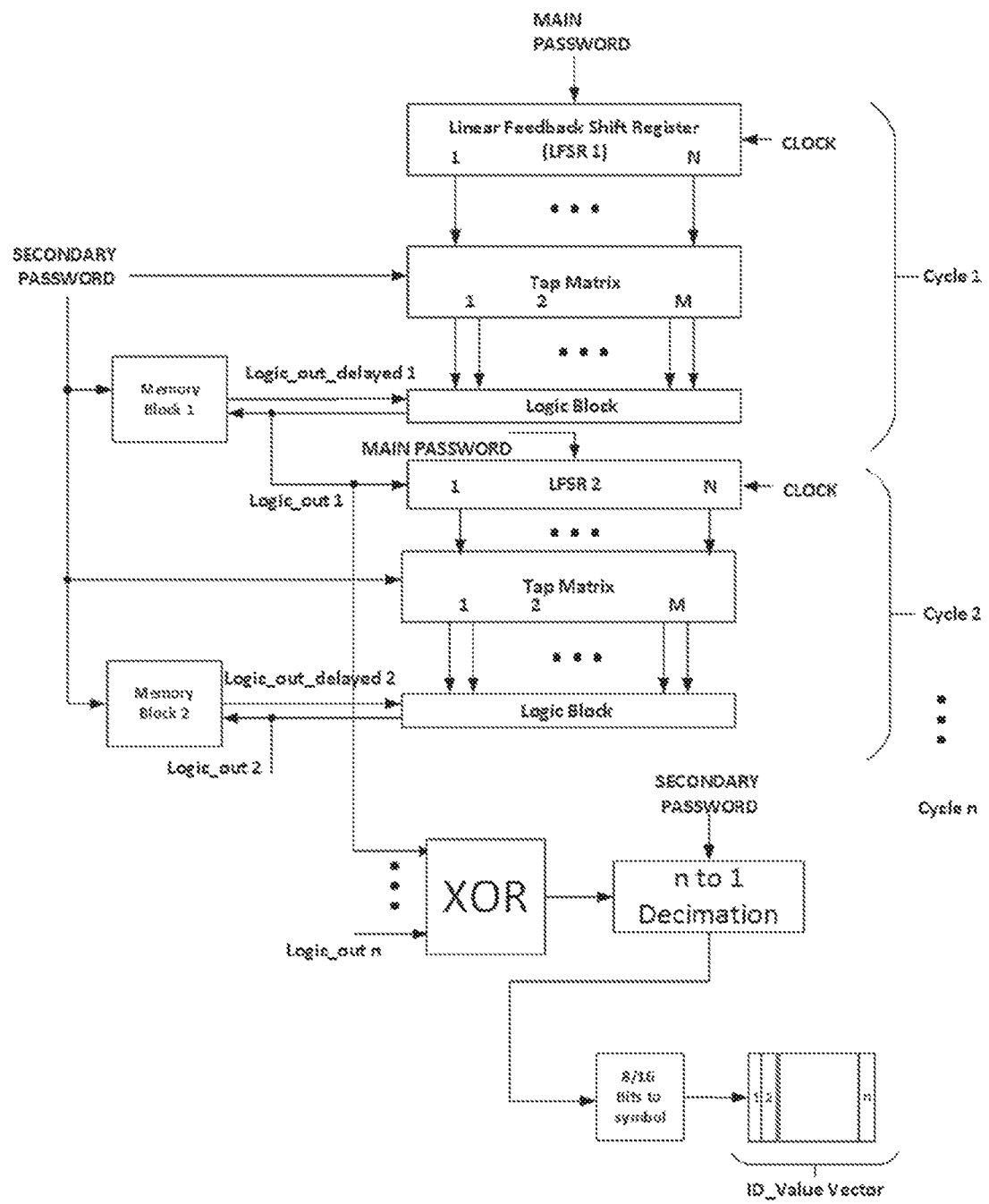
FIG. 11A, is a flowchart illustrating the periodic randomization of the port identifier, with FIG. 11B—a flowchart illustrating the authentication and encryption algorithm.
Figure 11B:
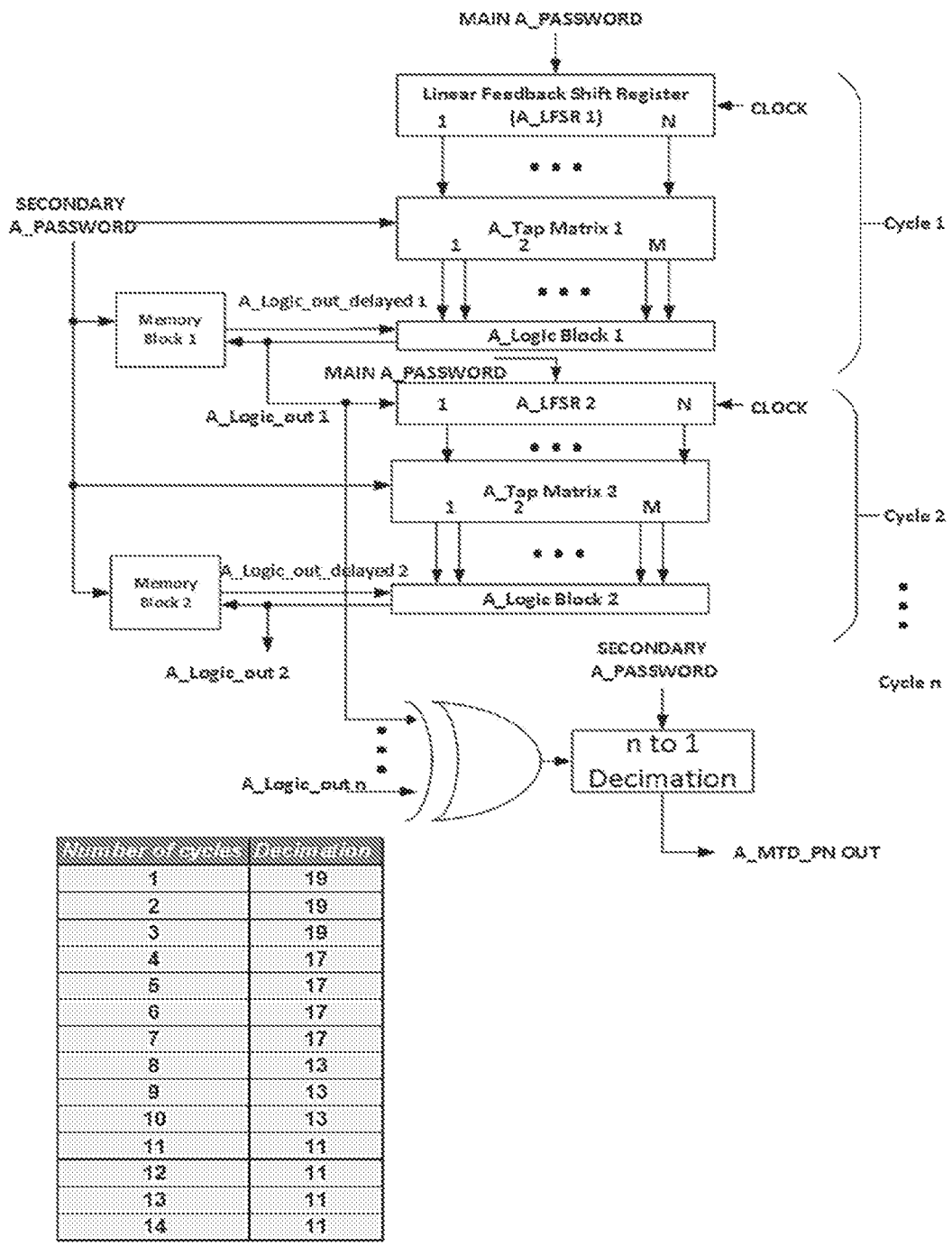

By deploying the systems described herein and implementing the methods provided, for enhanced authentication procedures (see e.g., FIG. 11B) of two password generation, employment of a time stamp and monitoring authenticated communication with the exception of randomly generated IoT identifier (in other words, not generating the random, temporary identifier), the system can be used to track network vulnerability and exposure to malicious activity, thus providing a built in, end-to-end insurability risk metric (key performance indicator—KPI). That KPI can be used by insurers in determining rates as well as in monitoring the network over time.

While the description hereinbelow focuses on Zone 3, it is contemplated that without undue experimentation, the same principles can be used for deployment of the system and the methods implemented in Zone 1 and Zone 2.

Connected computing devices that provide data and resources, such as digital cameras, motion sensors, thermal sensors, programmable logic controllers (PLCs), servers and the like; attached to a network, provide this data to clients through the use of network ports associated with the servers. A network port is a logical connection to the server that is associated with a particular source of data or with a particular service provided by the server. Port numbers may range between 0 and 65536 under the TCP communications protocol, where well known ports associated with standard networking services can be configured to use ports 0 to 1024.

An example of a typical method for finding susceptible hosts is "port scanning". Port scanning can be defined as "hostile Internet searches for open 'doors,' or ports, through, which attackers gain access to computers." This technique consist of sending a message to a port and listening for an answer. The received response typically indicates the port status and can be helpful in determining a host's operating system and other information relevant to launching a future attack. In the "connect scan"-type of port scan, a client initiates and ultimately establishes a full connection with the server for each service provided by the server (N2S).

As a result, the network address for the client is provided to the server, thereby providing the server with the identity of the client performing the scan. A second type of port scan, typically referred to as a "half open" scan or a "stealth" scan, may also be used. In a stealth scan, a port scanning client initiates but does not complete the establishment of a connection for each of the services. As with the connect-type port scan, the port scanning client receives a response from the server (S2N) when an open port is found; however, the port scanning client does not complete the message exchange necessary to fully establish the connection. Because of this fact, the attacker may transmit a large number of messages initiating establishment of a connection where each of these messages possess a different network address. The server will respond to each of these TCP request messages, but only one such response actually reaches the attacker. Consequently, the server would not typically possess any information to differentiate the actual request from the attacker, from all of the other decoy service requests. As such, a server (or service provider, SP), may realize that a stealth port scan is occurring while not being able to identify the attacker, or its IP address, that is initiating the port scan. The server may be unable to prevent the stealth port scan without rejecting service requests from legitimate clients. As a result, many servers providing data and related services to IoT clients remain vulnerable to potential attack by unscrupulous clients through successful use of a stealth port scans.

Figure 3:
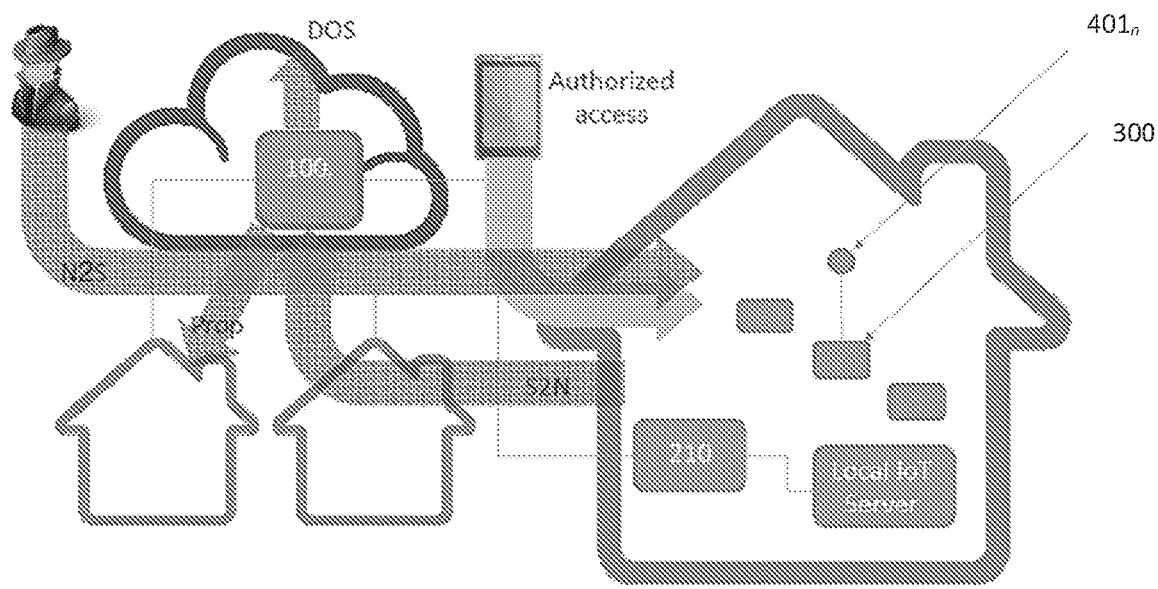
FIG. 3, illustrates a threat map for connected IoT devices in a smart home.
Figure 4:
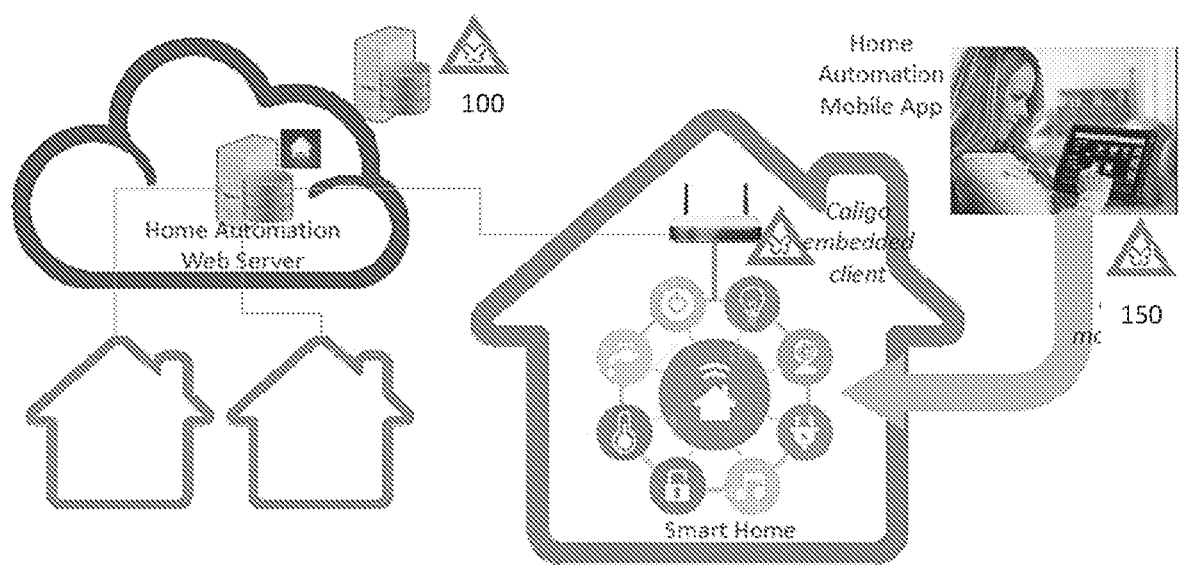
FIG. 4, illustrates a schematic of the system implementation in a smart home.
Figure 5:
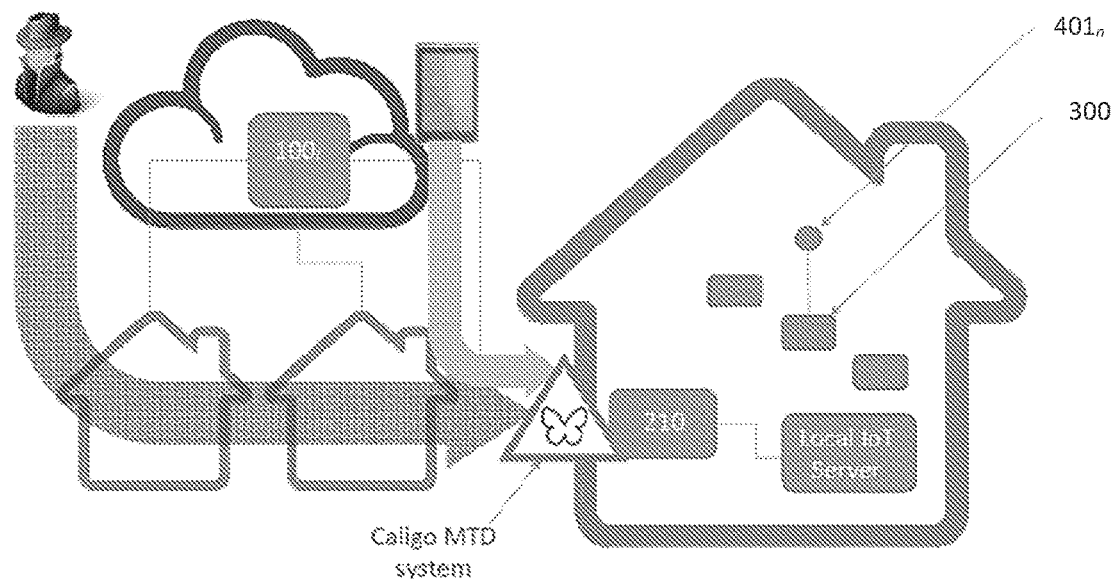
FIG. 5, illustrates system implementation using MTD to mitigate N2S threat.
Figure 6:
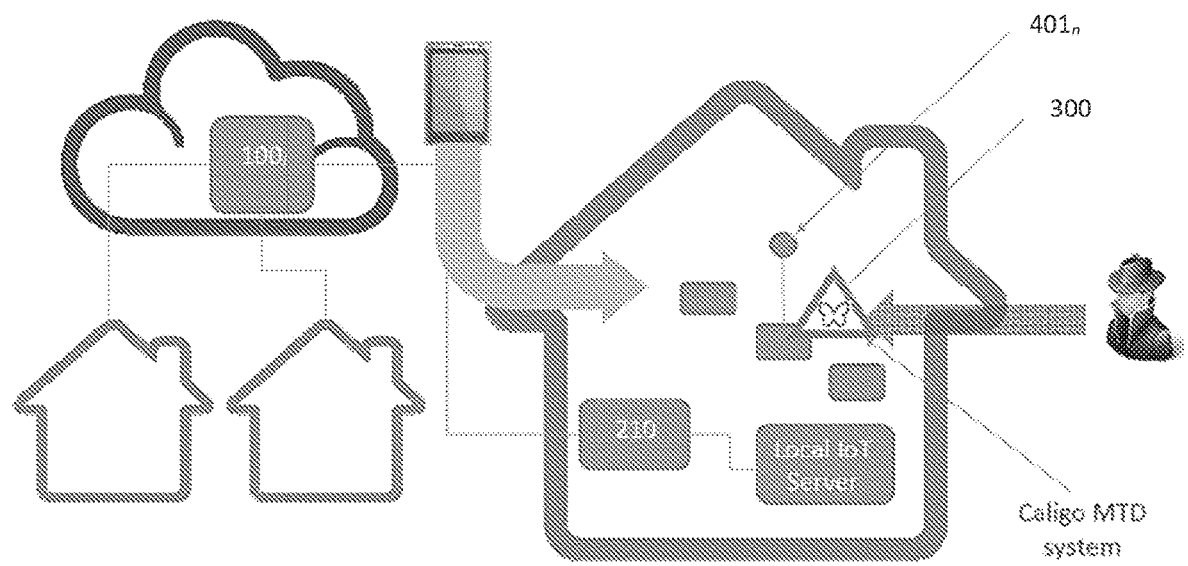
FIG. 6, illustrates system implementation using MTD to mitigate S2N timing threat.

Other threats to a network (such as those illustrated in FIGS. 3, 5, and 6) can include active attacks, where an attacker interacts or engages with systems in the network to steal information or do harm to the network. An attacker may be a person, or may be an automated system. Examples of active attacks, include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network.

Another example where the systems and methods described herein can be implemented, is Supervisory Control and Data Acquisition (SCADA) systems. These network systems refer to industrial control systems. SCADA systems are typically configured to monitor and control industrial, infrastructure processes and equipment, such as those involved in oil refining, water treatment, manufacturing, production, and power generation. Because SCADA systems often control Critical National Infrastructure (CNI) elements ranging from nuclear power plants to flood gates, they are seen as prime cyber-terrorism targets. While in the past, various components of SCADA systems were connected only over short serial connections, as both the components of SCADA systems and the protocols they use to communicate have become standardized, they have also become increasingly connected over shared and distributed networks, including the Internet. This increased connectivity has given adversaries new attack vectors against these critical systems. In addition, many SCADA systems are heavily reliant on connected sensors, each with their own IP address and connection protocol.

SCADA systems can comprise at least one of: a supervisory computer system, gathering data on the process and sending commands to control to the process, a Programmable Logic Controllers (PLCs) or other field programmable gate array (FGPA), which are essentially small computers used to control electromechanical processes (e.g., to switch something on or off, to control a valve, etc.), Remote Terminal Units (RTUs) which convert sensor signals to digital data and send digital data to the supervisory system, and a Human-Machine Interface (HMI) which presents process data to a human operator, and allows the operator to issue commands. As indicated, these SCADA elements communicate with each other over wired and/or wireless networks, including IP-based networks over various transports. SCADA elements may communicate over shared or disparate networks and may utilize Web protocols for communication and display of data. In an embodiment, and to enhance SCADA systems security, the methods described herein, when implemented can be configured to periodically generate temporarily valid network address translation (NAT) table to mission critical sensors or other network nodes, for example, at least one of the network node's port's number, the port's internal IP address, and the port's public source IP address.

Figure 1:
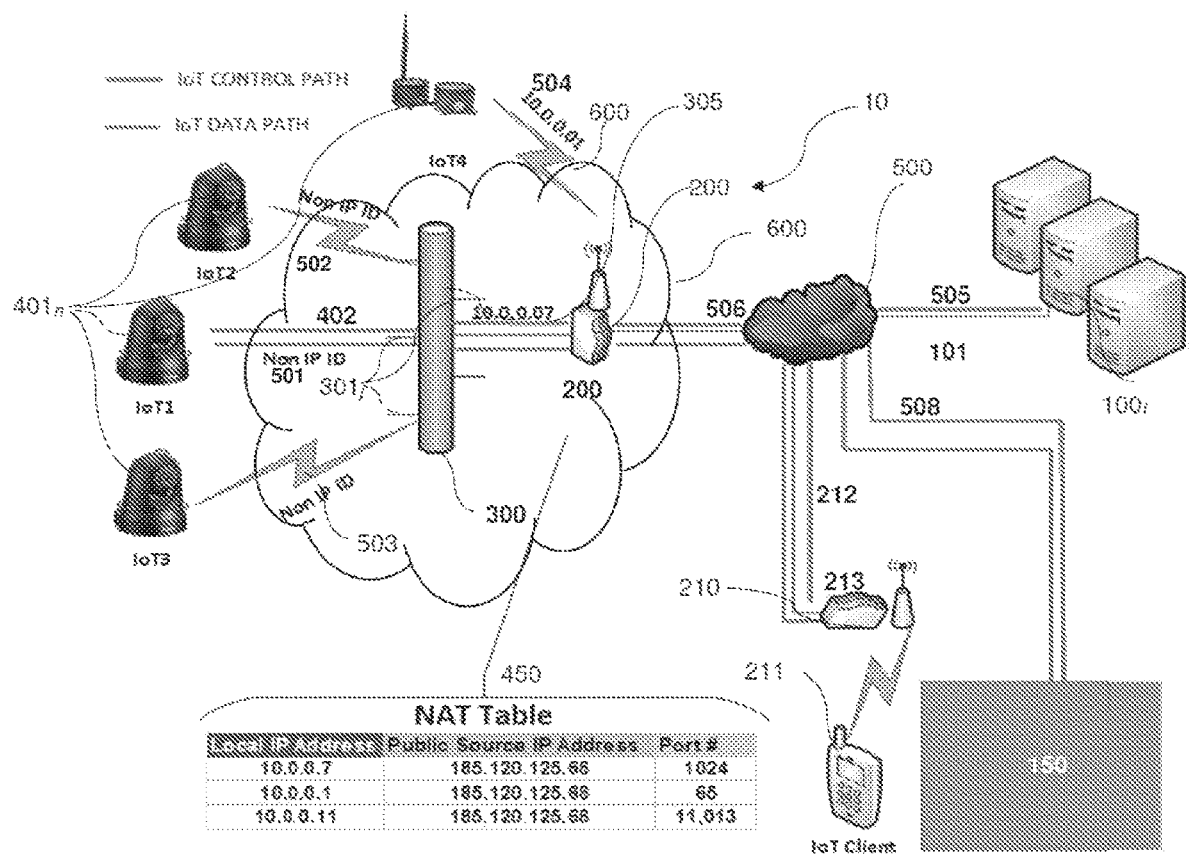
FIG. 1, Illustrates high-level system architecture schematic.

In an embodiment, and as illustrated in FIG. 1, provided herein is system 10 implementing a moving target defense (MTD) against a malicious port scanning, spoofing attack replay attack, or their combination, system 10 comprising:

edge network switch 200 communicatively coupled to external network (cloud) 500; backend management server 100 in communication with a non-volatile memory having stored thereon a set of executable instructions, that, when executed by a processor, cause the processor to periodically randomize a temporarily valid port identifier (see e.g., NAT table 450), each port identifier associated with an internal port identifier (501, 502, 503, 504); the processor communicatively coupled to edge network switch 200 and backend management server 100. The system also comprises IoT gateway 300 having plurality of ports $301_j$ thereon in communication with edge network switch 200, each $j^{th}$ port $301_j$, associated with connected Internet of Things (IoT) device $401_n$, wherein the instructions, when executed, further cause the processor to: via edge network switch 200, receive a request 508 from request originator 211 for data from connected $n^{th}$ IoT device $401_n$; select the temporarily randomized port identifier; and send 212 the periodically randomized and temporarily valid port identifier to request originator 211.

The term "communicatively coupled" is defined as a state in which two or more components are connected such that communication signals are able to be exchanged between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The terms "computer program medium" and "computer readable medium" are defined as one or more components that are configured to store instructions that are to be executed by a processing unit or some other component.

Network(s) 500 (600) can comprise any combination of a wide area network (WAN), local area network (LAN), wireless network, wireless LAN (WLAN), or any similar means for enabling communication of computing systems. Network(s) 500 (600) can also collectively be referred to as the Internet.

As illustrated, the instructions, when executed by the processor, are further configured to periodically and generate temporarily valid network address translation (NAT) table 450, comprising the port's number, the port's internal IP address, and the port's public source IP address.

Network address translation (NAT) refers to a method to map a first IP address space into a second IP address space by modifying network address information in Internet Protocol (IP) datagram packet headers (e.g. one or more of IP address, port, etc.), while packets are in transit across a traffic routing device (e.g., router 210, edge network switch 200, IoT gateway 300, connected IoT devices $401_n$, etc.). Every TCP and UDP packet contains a source IP address and source port number as well as a destination IP address and destination port number. The local IP address/port number pair forms a socket. In particular, the source IP address and source port number form the source socket. As an example, for publicly accessible services such as web servers and mail servers the port number is important. For example, port 80 connects to the web server software and port 25 to a mail server's SMTP daemon. The IP address of a public server is also important, similar in global uniqueness to a postal address or telephone number. Both IP address and port number must be correctly known by all hosts wishing to successfully communicate. The NAT described and used herein, can be highly beneficial tool in conserving global address space allocations in face of IPv4 address exhaustion and as indicated, by the expansion of IP addresses through SPs' deployment of IPv6.

The types of NAT generated by the methods described herein, implemented by the systems provided, can be, for example: traditional NAT (or outbound NAT) with unidirectional sessions, outbound from the private network, including basic NAT (address translation) and Network Address Port Translation (NAPT); bi-directional NAT (or two-way NAT) with sessions initiated from hosts in the public network and the private network; twice NAT with mapping of both source and destination addresses c.f. traditional NAT etc. where only one addresses (source or destination) is translated (e.g. used when private and external realms have address collisions e.g., a site improperly numbers its internal nodes using public addresses assigned to another organization.); multihomed NAT with multiple NAT devices or multiple links on the same NAT device; full-cone NAT, also known as one-to-one NAT, where an internal address (iAddr:iPort) is mapped to an external address (eAddr:ePort), any packets from iAddr:iPort are sent through eAddr:ePort, and any external host can send packets to iAddr:iPort by sending packets to eAddr:ePort; (address)-restricted-cone NAT, where an internal address (iAddr:iPort) is mapped to an external address (eAddr:ePort), any packets from iAddr:iPort are sent through eAddr:ePort, and an external host (hAddr:any) can send packets to iAddr:iPort by sending packets to eAddr:ePort only if iAddr:iPort has previously sent a packet to hAddr: any (where 'any' means any port number); port-restricted cone NAT (similar to address restricted cone NAT, but the restriction includes port numbers) where an internal address (iAddr:iPort) is mapped to an external address (eAddr:ePort), any packets from iAddr:iPort are sent through eAddr:ePort, and an external host (hAddr:hPort) can send packets to iAddr:iPort by sending packets to eAddr:ePort only if iAddr:iPort has previously sent a packet to hAddr:hPort; symmetric NAT where each request from the same internal IP address and port to a specific destination IP address and port is mapped to a unique external source IP address and port; if the same internal host sends a packet even with the same source address and port but to a different destination, a different mapping is used and only an external host that receives a packet from an internal host can send a packet back.

When a connected IoT device (e.g., edge network switch 200, IoT gateway 300, connected IoT devices $401_n$, etc.) on a private (e.g. internal, corporate, private, e.g., smart home etc.) inside network 600 sends an IPv4, or IPv6 subnetting packet to an external (e.g. public, routable, etc.) network 500, the NAT device (e.g. backend management server 100) replaces the internal IP address in the source field of the packet header (i.e. the sender's address) with the public source IP address of the NAT device. Port Address Translation (PAT), can then be configured assign the connection a port number using the randomly generated and temporarily valid port identifier, inserting this port number in the public source port field (much like a temporarily valid post office box number), and forward the packet to the external network 500. The NAT device (e.g., backend management server 100) can then make an entry in a translation table containing the internal IP address, original source port, and the translated source port (see e.g., NAT Table 450). Subsequent packets from the same connection can then translated to the same port number, so long as session period remains the same.

Figure 12:
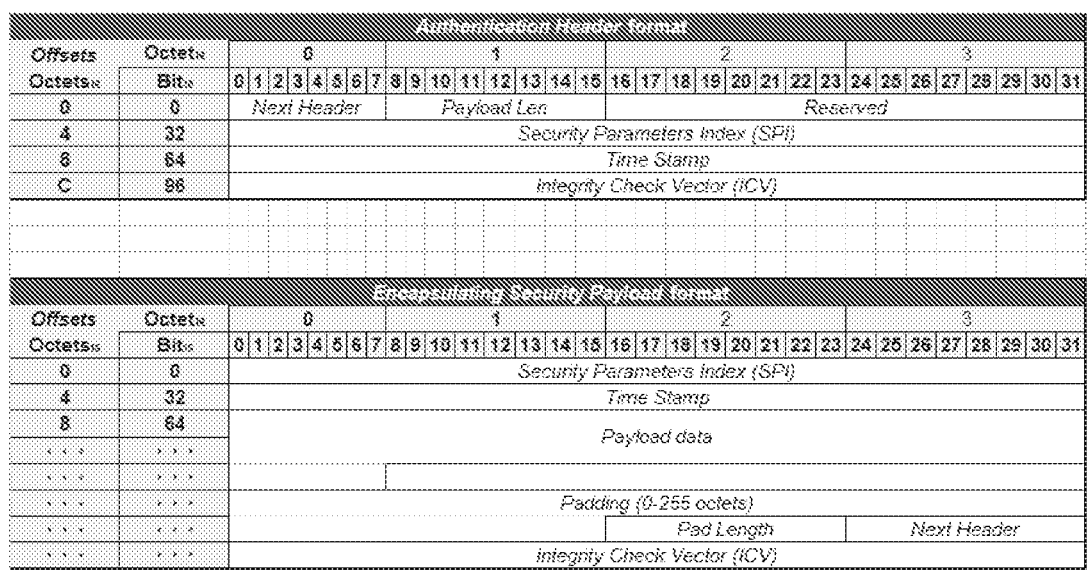
FIG. 12, illustrates the authentication header format and the encapsulating security payload format.

Connected IoT device $401_n$, or request originator, or IoT client 210, receiving packet (402, 212 respectively), that has undergone NAT/PAT, establishes a connection to port $301_j$ and IP address specified in the altered packet 402, 212, oblivious to the fact that the supplied public source IP address is being translated (analogous to using a temporarily valid, fictitious post office box number). Packet 212 coming from external network 500 can be mapped to a corresponding internal IP address and port number from the translation table, replacing the external IP address and port number in the incoming packet header (similar to the translation from a post office box number to a street address, see e.g., FIG. 12). The packet is then forwarded via edge network switch 200, over the inside network 600 (or 501 and/or 502, see e.g., FIG. 2) using for example, IoT gateway 300. Otherwise, if destination port number of the incoming packet defined on the frame is not found in the translation table, the packet is dropped or rejected because the PAT device (e.g., backend management server 100) doesn't know where to send it. NAT only translates IP addresses and ports of its internal hosts, hiding the true endpoint of an internal host on inside network 600. As illustrated in FIG. 12, of an embodiment of the packet frame information format, the security parameter index (SPI) used for the authentication header in the systems and methods described herein, can be specific to each zone (see e.g., FIG. 2).

Figure 13:
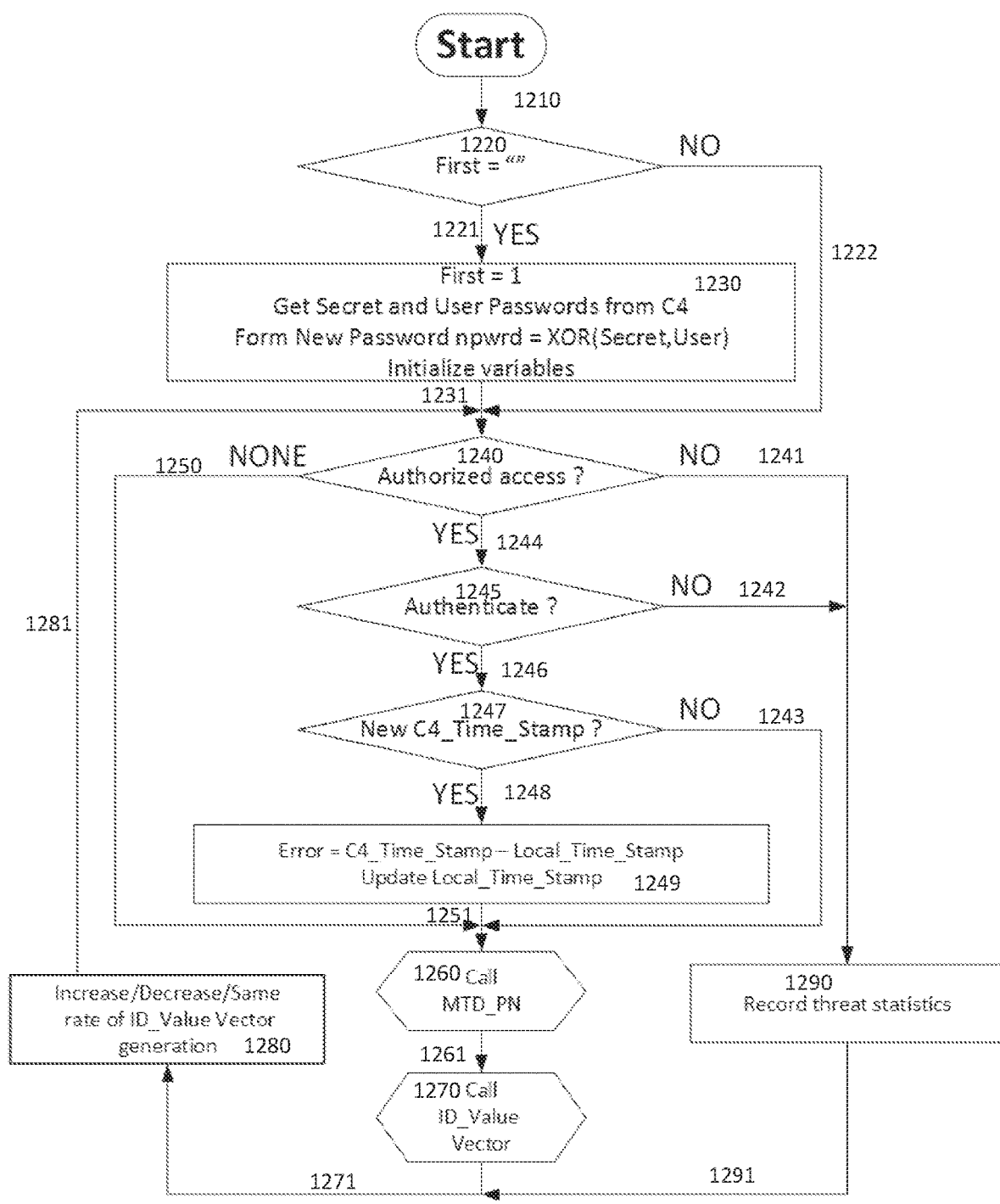
FIG. 13, is a schematic illustrating the main flowchart.
Figure 14:
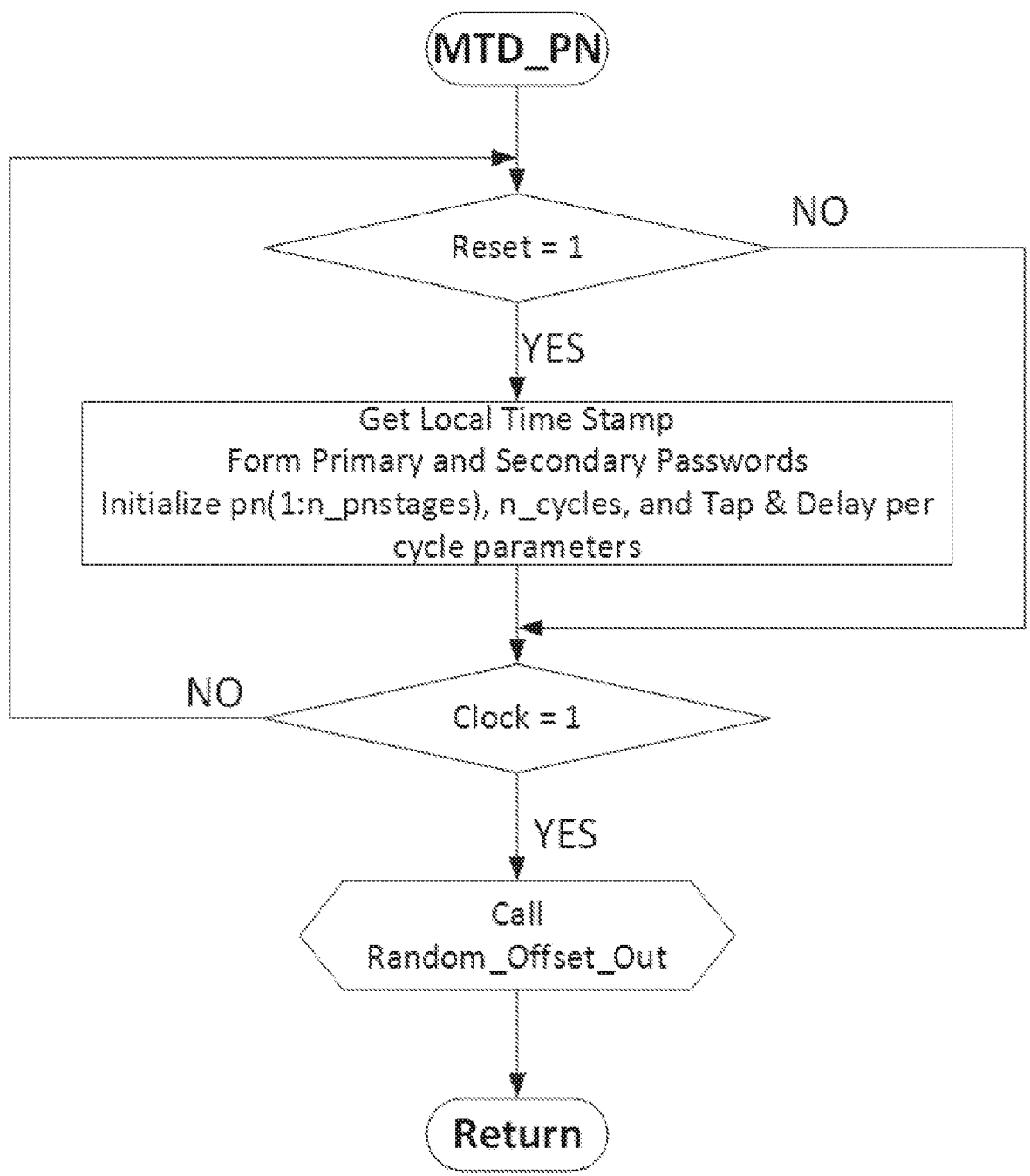
FIG. 14, is a schematic illustrating an embodiment of the algorithm used to determine the periodicity of port ID identifier generation.
Figure 19:
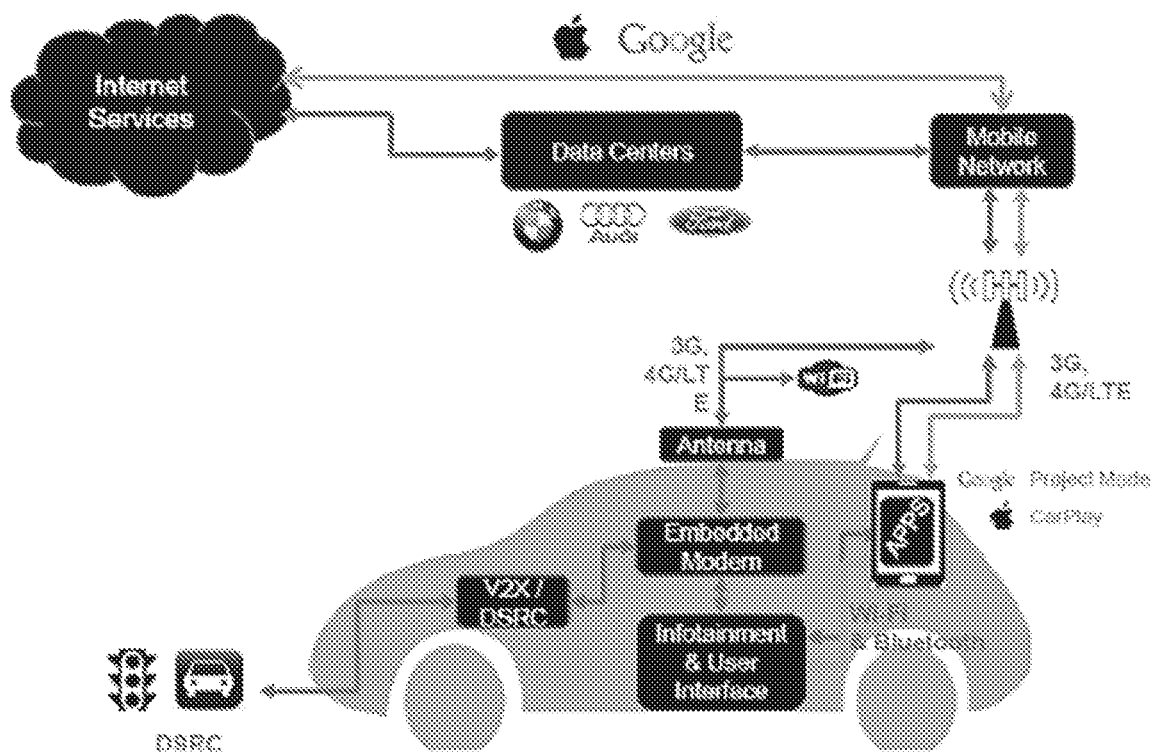
FIG. 19, is a schematic illustrating application of the systems to IoT connected vehicles

As illustrated in FIG. 13, if access is authorized 1240, meaning the correct ID vector was provided in the packet frame, however connections failed 1241, 1242, these attempts can be recorded 1290 in a database of records concerning known $n^{th}$ connected IoT devices $401_n$ (e.g., a camera, a thermal sensor, a motion detector, an actuator, an autonomous vehicle (see e.g., FIG. 19), industrial sensors, or a combination of IoT devices comprising the foregoing), and the number of unsuccessful requests associated with each $n^{th}$ connected IoT device $401_n$, which can be maintained on non-volatile memory operably coupled to backend management server 100.

Figure 10A:
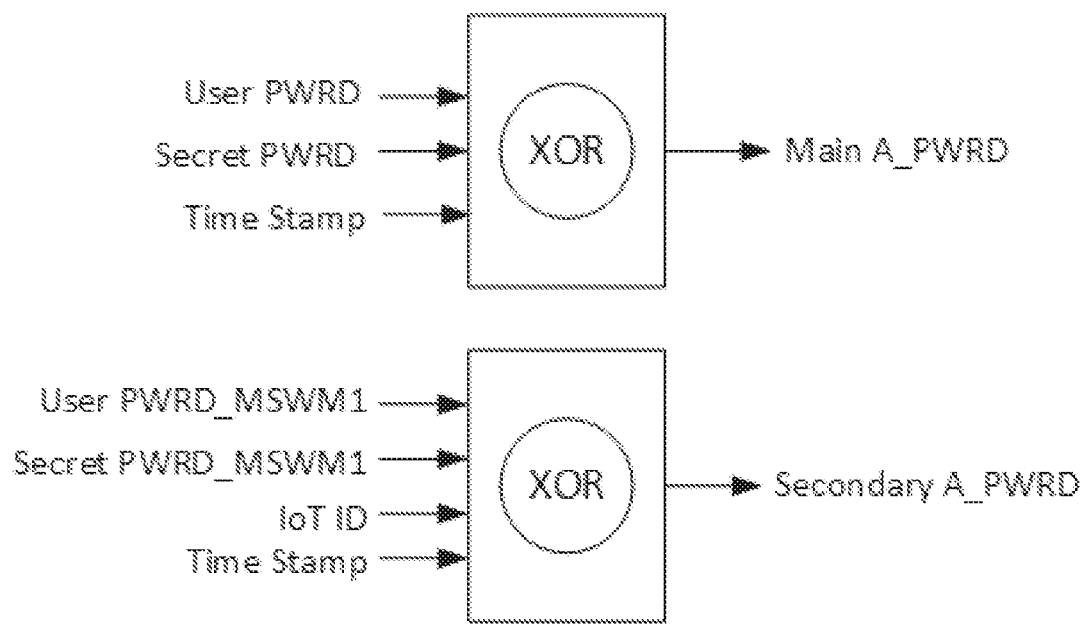
FIG. 10A illustrates the credentials for generating main and secondary passwords for authenticating a request originating at the connected IoT device and terminating on the a user device, with the credentials for generating main and secondary passwords for authenticating a request originating at the user device and terminating on the connected IoT device illustrated in FIG. 10B and the credentials for generating main and secondary passwords for the randomization of the port identifier in FIG. 10C.
Figure 10B:
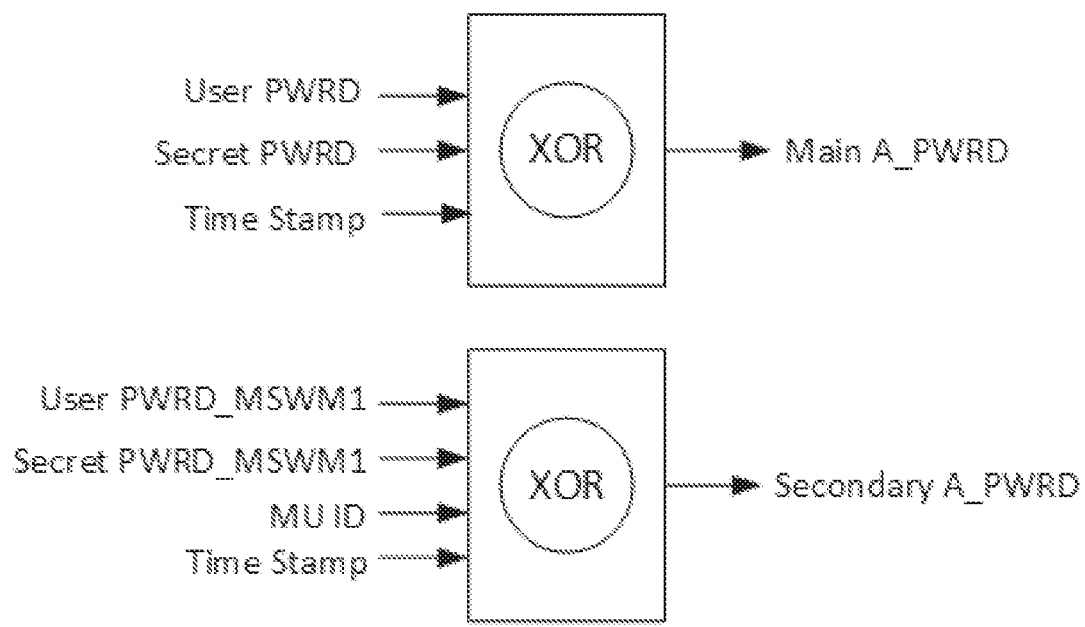
Figure 10C:
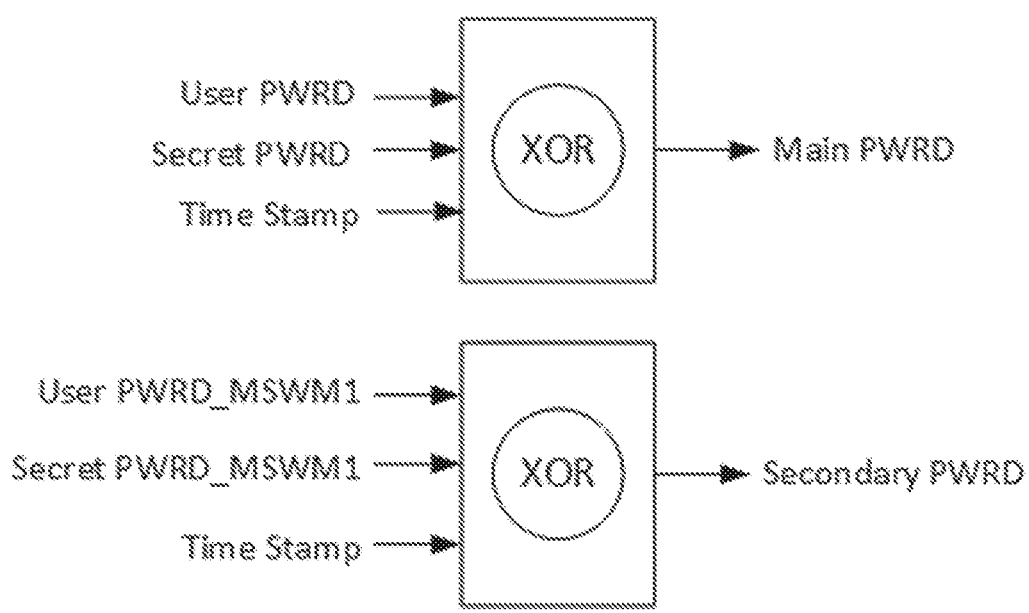

If the system is implemented solely for the purpose of connectivity assurances and (packet) tracking and reliability, for insurability for example, process 1249 can be directed back directly to step 1281 to monitor authorized access 1240, without updating the first password (see e.g., FIGS. 10A-10C), or the ID vector for the plurality of connected edge IoT devices $401_n$.

Furthermore, depending on a predetermined upper threshold number of unsuccessful requests, either for the whole inside private network 600 (comprised in an embodiment of proximity network 501 and backhaul network 502), or in connection (as related to) a specific $n^{th}$ connected IoT devices $401_n$, the instructions, when executed by the processor can be further configured to increase the frequency of randomizing the port identifier 1280, and/or decrease the time the randomized port identifier is valid. Alternatively or additionally, depending on a predetermined lower threshold number of unsuccessful requests, either for the whole inside private network 600, or in connection with a specific $n^{th}$ connected IoT devices $401_n$, the instructions, when executed by the processor can be further configured to increase the frequency of randomizing the port identifier 1280, and/or decrease the time the randomized port identifier is valid.

As disclosed, packets from the same connection can then be translated using address resolution protocol (ARP) via the NAT/PAT table (or MAC address table, content addressable memory (CAM) table and the like), to the same port number, so long as the session period remains the same, or as per the time stamp provided in the packet header has not been exceeded. A session can be defined as the set of traffic e.g. that is managed as a unit for translation, or, in another embodiment, a sequence of network request-response transactions. TCP and UDP sessions are uniquely identified by the tuple of (source IP address, source TCP/UDP port, target IP address, target TCP/UDP port). ICMP query sessions are identified by the tuple of (source IP address, ICMP query ID, target IP address). All other sessions are characterized by the tuple of (source IP address, target IP address, IP protocol). IP address, as used herein, refers in an embodiment to a binary number assigned to a device on an IP network (e.g., 172.16.254.1) and can be formatted as a 32-bit dot-decimal notation (e.g., for IPv4 subnetting) or in a notation to represent 128-bits, such as "2001:db8:0:1234:0:567:8:1" (e.g., for IPv6 subnetting).

A session flow indicates the direction in which a session was initiated with reference to a network interface. A packet flow is the direction in which a packet has traveled with reference to a network interface.

Figure 8:
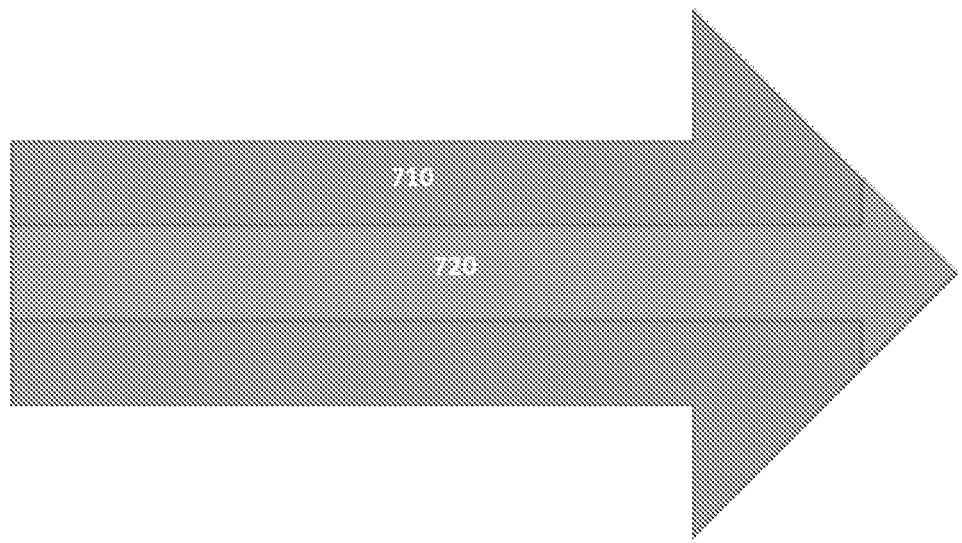
FIG. 8, is a schematic illustrating security system components pertaining to secure routing, data encryption and authentication.
Figure 9:
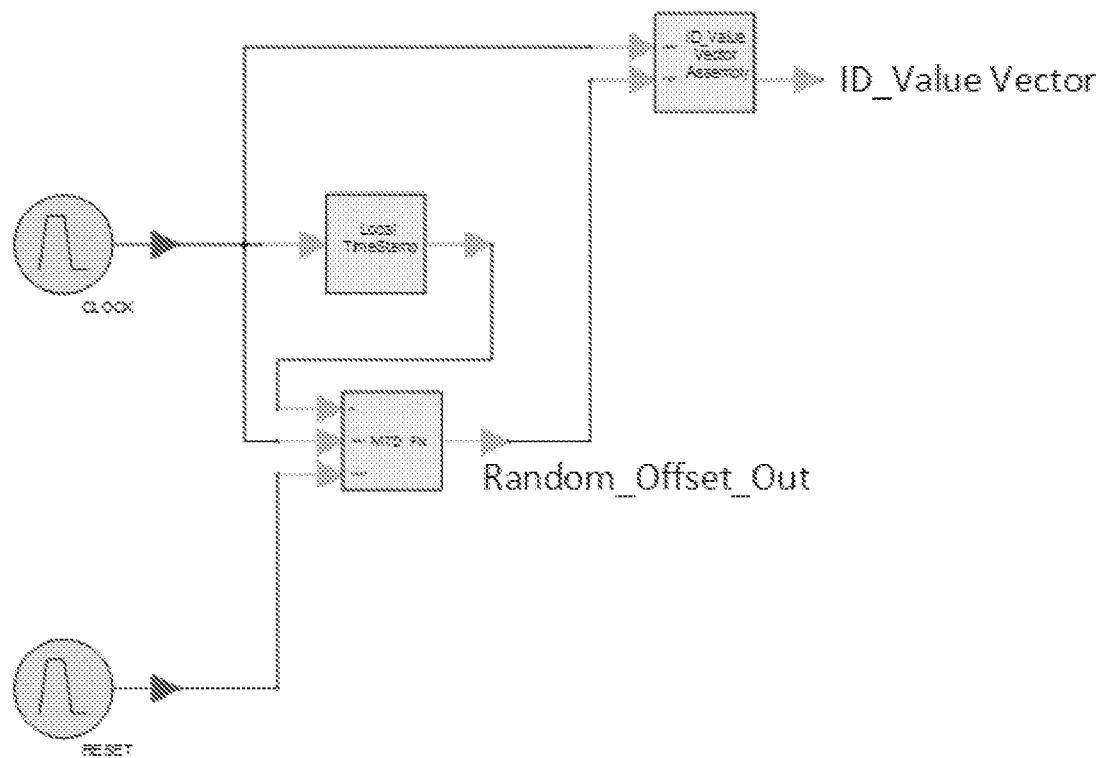
FIG. 9, is a block diagram illustrating periodic generation of offset vector for the port identifier.

Once an authenticated connection is established (see e.g., FIG. 8), in other words, allowing only legitimate traffic, whereby the correct, currently valid and randomly generated ID vector, which follows fast dynamic pattern is identified, may be routed through to, or from $n^{th}$ connected IoT devices $401_n$, 710 and whereby only authenticated packets are scrambled 720 (in other words, encrypted).

It is contemplated, that each system component, (e.g., edge network switch 200, IoT gateway 300, connected IoT devices $401_n$, etc.) is a module. The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads). Likewise, "edge network switch" refers to a network device which receives data at multiple input ports and provides that data to an output port (e.g., capable of returning a value in an ARP table), for transmission over a communication link, and may also include computer networking devices such as a hub, router, bridge, gateway, multilayer switch and the like.

In addition, the computer program (software and/or firmware), can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, the processor used in the methods implementable in the systems disclosed, may be operably coupled to the various modules (e.g., edge network switch 200, IoT gateway 300, connected IoT devices 401$_n$, etc.) and components with appropriate circuitry. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. Furthermore, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. Accordingly and in an embodiment, the central processing unit used in the systems, methods and devices disclosed herein can be in communication with edge network switch 200, IoT gateway 300, or backend management server 100, via management port, for example is a USB port, a Serial port, a RJ45 port, or a Fiber port.

To support management communications to backend management server 100, system's 10 and inside network 600 can be adapted to implement a predetermined port (e.g., port 0 (zero)) as a management port, to which management packets 506 directed to and/or from the processor can be addressed. For this purpose, management port (e.g., 305, FIG. 1) can have its own local identifier (LID—the link-layer address in the secure data network), which can be assigned to it by a subnet manager (SM), or in another embodiment, be specific to the device (e.g., IoT gateway 300). When the subnet manager agent (SMA) runs on an embedded CPU within IoT gateway 300, management port 305 can be an internal management port; otherwise, the management port can be configured for connection to external computerized system via external network cloud 500, in communication with backend management server 100.

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers (OSI L1).

As may also be used herein, the terms "communication processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The modules and components of the system described herein, may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information.

Note that if system 10 components include more than one processing device, the processing devices may be centrally located (e.g., directly coupled together to, for example, IoT gateway 300 via a wired and/or wireless bus structure) or may be distributed (e.g., cloud computing via indirect coupling via a local area network and/or a wide area network). Further note that if system 10 components implement one or more of their functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and system 10 components execute, hard coded and/or operational instructions corresponding to at least some of the steps and/or functions illustrated in one or more of the figures; such a memory device or memory element can be and is included in an embodiment as an article of manufacture.

In an embodiment, the systems modules and apparatuses or devices described herein, are implemented to perform the methods described herein. Accordingly and in another embodiment, provided herein is a method of providing secure network communication for plurality of connected Internet of things (IoT) devices, the method implemented on a system comprising: an edge network switch communicatively coupled to a network; a backend management server in communication with a non-volatile memory having stored thereon a set of executable instructions, that, when executed by a processor, cause the processor to periodically randomize a temporarily valid port identifier, each temporarily valid port identifier associated with an internal port identifier and a port number; the processor communicatively coupled to the edge network switch and the backend management server; and a IoT gateway having a plurality of ports thereon in communication with the edge network switch, each port associated with a connected Internet of Things (IoT) device, wherein the instructions, when executed, further cause the processor to: via the edge network switch, receive a request for data from a connected device, select the randomized port identifier, and send the periodically randomized and temporarily valid port identifier to the request, the method comprising: using the backend management server, periodically generating a temporarily valid randomized identification (see e.g., FIG. 11A) for a port associated with a connected IoT device; and upon receiving authenticated communication request (see e.g., FIG. 13, 1244, 1246) between a user and the connected device that specify the port associated with the connected IoT device, and using a temporarily valid scrambling key, encrypting the data communicated from the device to the user.

As indicated, only authenticated data stream(s) can be encrypted using advanced encryption standard (AES, or Rijndael), referring to the symmetric 128-bit block data encryption technique, and/or triple data encryption standard (3DES) referring to the 3× nested encryption using 64-bit blocks for a total of 192-bits, and/or or a combination thereof. In an embodiment data encryption techniques can use 256-bit encryption, or 2× 128-bit encryption, and use various other protocols, for example, PRESENT®, CLEFIA® and the like, or hardware oriented stream cyphers, for example; ENCORO®, or PHOTON®.

To facilitate encryption/decryption protocol, in another embodiment, the system may further comprise an encryption/decryption accelerator, in communication with edge network switch 200 and/or IoT gateway 300, and/or backend management server 100. The encryption accelerator may be configured to encrypt and decrypt information in accordance with a plurality of cryptographic functions, receive a command from IoT gateway 300, and/or backend management server 100 to perform an encryption or decryption task upon authenticated network data stream associated with an input/output operation, and in response to receiving the command, encrypt or decrypt the authenticated network data stream associated with the input/output operation based on a particular one of the plurality of cryptographic functions (see e.g., FIGS. 10A, 10B, 10C).

Figure 15:
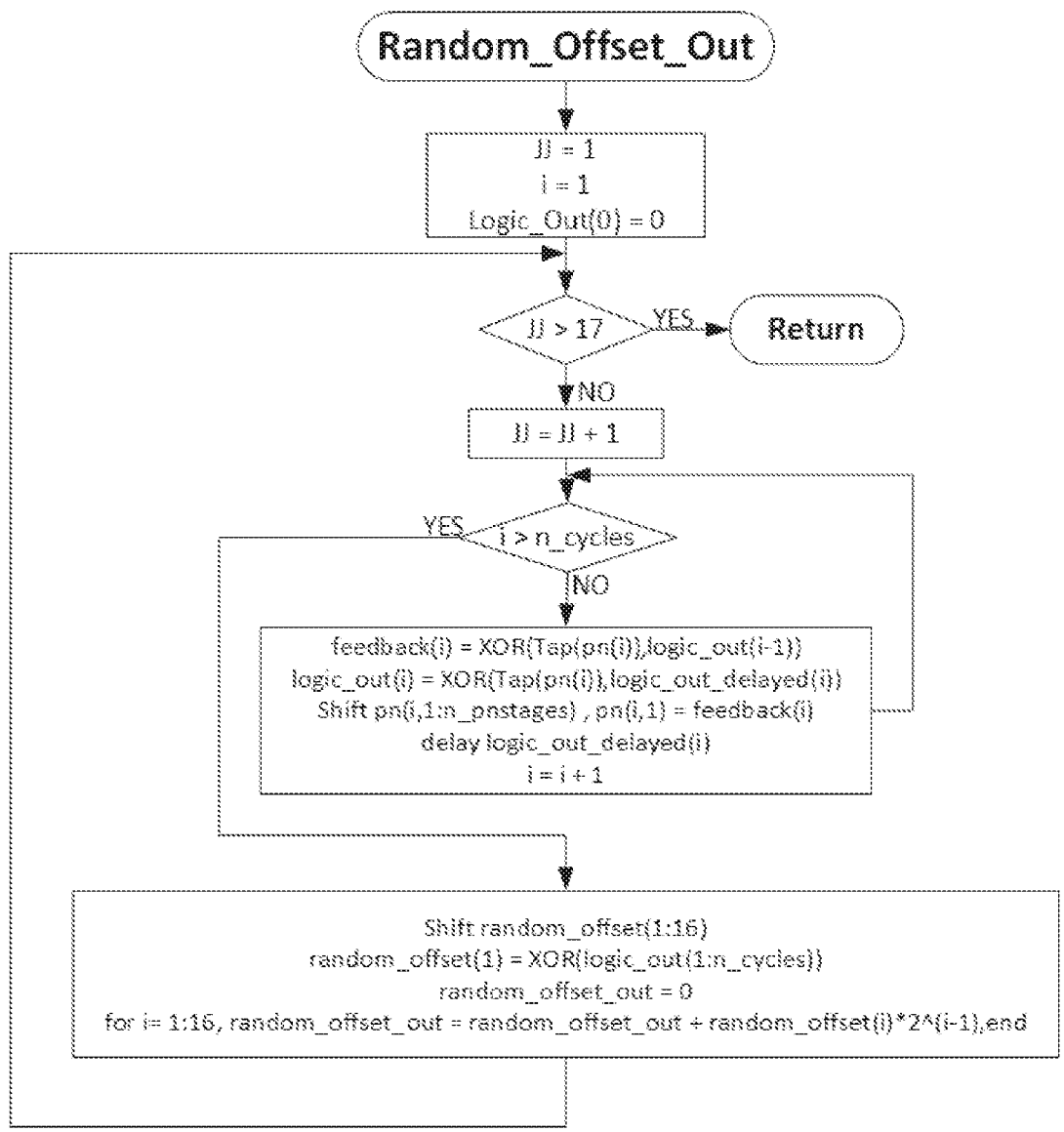
FIG. 15, is a schematic illustrating an embodiment of the algorithm used to offset the currently valid port identifier.
Figure 16:
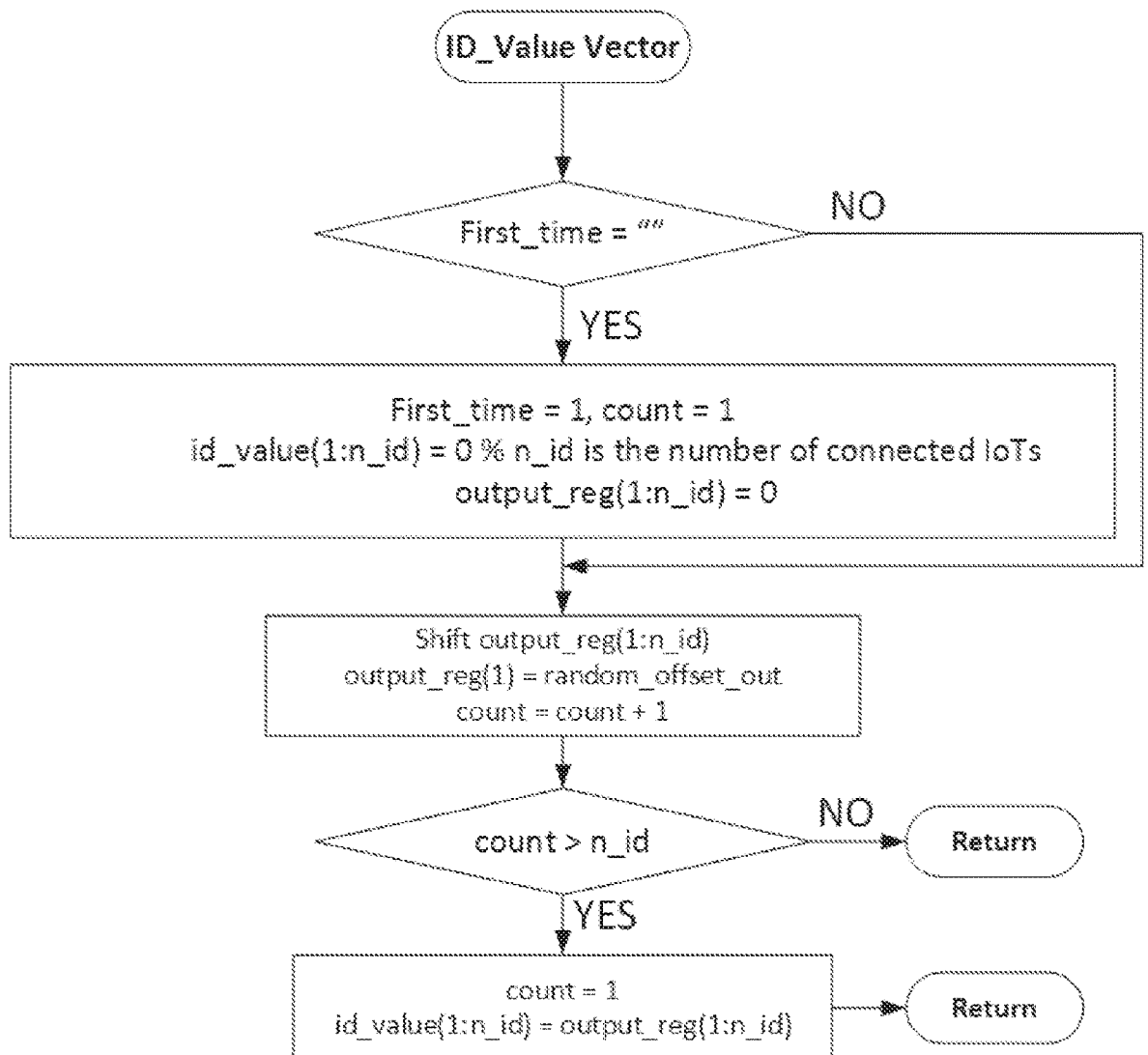
FIG. 16, is a schematic illustrating an embodiment of the algorithm used to generate the value offset vector.
Figure 17:
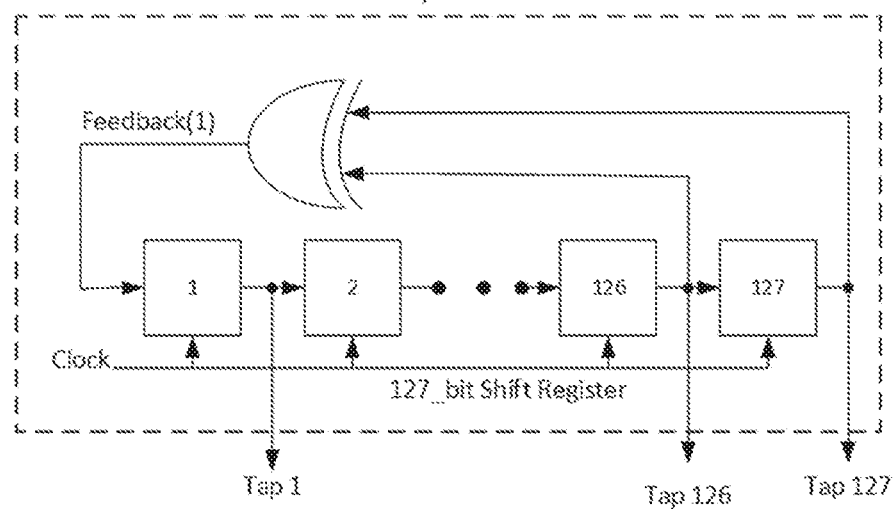
FIG. 17, is a schematic illustrating the first cycle of the linear shift feedback register (LSFR) (top) and any consecutive LSFR (bottom)
Figure 17:
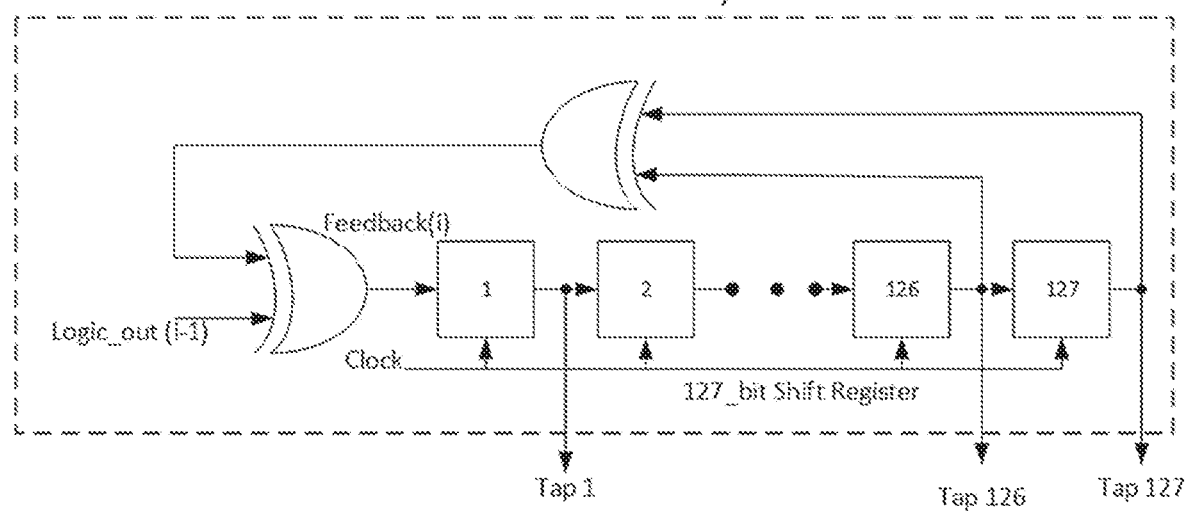
Figure 18:
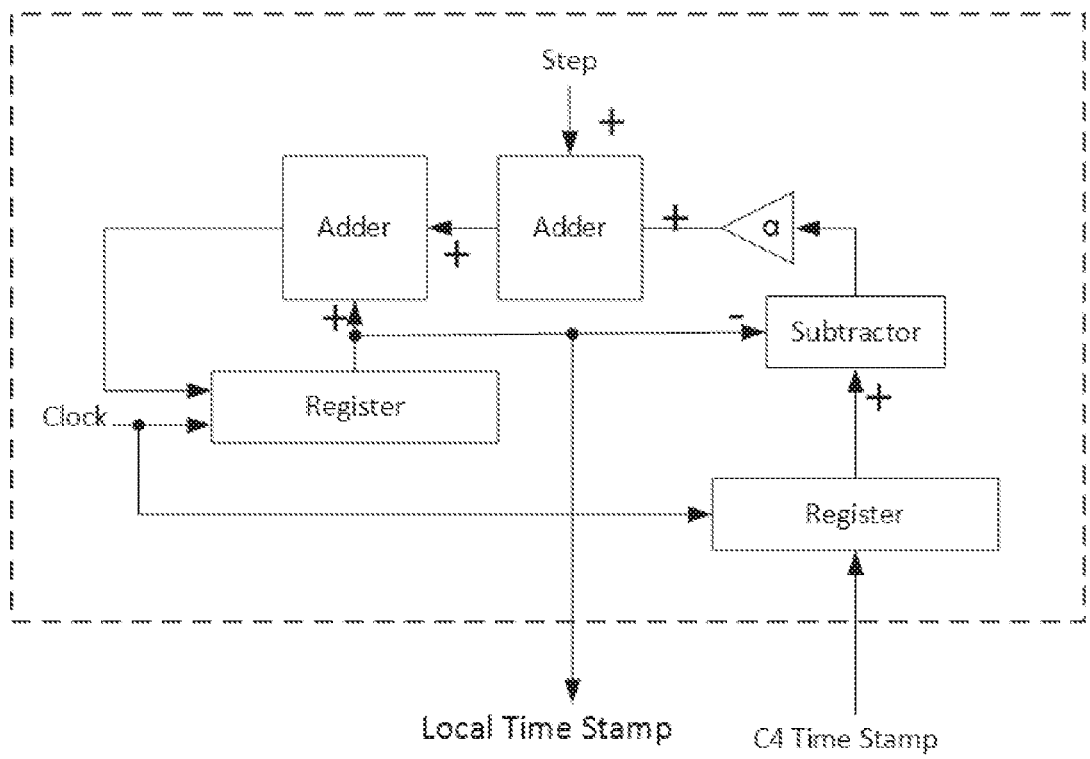
FIG. 18, is a schematic illustrating the generation of time stamp used as part of the port identifier randomization procedure.

The step of generating periodically randomized and temporarily valid port identifier as illustrated in FIGS. 9-18 and that is used in the methods of providing secure network communication for plurality of connected IoT devices described herein, can comprise: using the backend management server, generating a first (secret) password; using edge network switch 200, obtaining a second (user/request originator 211) password; generating a time stamp (see e.g., FIG. 17); using the first password, the second password and the time stamp (see e.g., FIG. 10C), generating a unique ID offset vector (see e.g., FIG. 13, 1270); applying the ID offset vector to a currently valid port identifier (see e.g., FIG. 14); and generating periodically randomized and temporarily valid port identifier (see e.g., FIG. 15).

As described hereinabove, the step of encrypting the data communicated from the device to the user is preceded by: generating a temporarily valid scrambling key; apply the scrambling key to the data; and sending the (de)scrambling key to the request (or request originator—IoT client 211, FIG. 1). Generating the temporarily valid scrambling key can depend on the data flow direction as described for example, in FIG. 10A, 10B; and can comprises: using the first password, the second password, the internal port ID, and the time stamp, generating the scrambling key (see e.g., FIGS. 11B, 17).

In addition, wherein the step of encrypting the data is preceded by a step of authenticating the request originator (or in other words, validating the identity of the request originator), whereby the step of authenticating can comprise providing the request originator network credentials; and providing the (currently) valid port identifier.

The connected IoT devices, or "things," in the IoT sense, may refer to a wide variety of devices, including but not limited to, devices such as heart monitoring implants, biochip transponders on farm animals, electric clams in coastal waters, automobiles with built-in sensors (see e.g., FIG. 19), or field operation devices that assist firefighters in search and rescue operations, etc. These devices collect useful data with the help of various existing technologies and then autonomously flow the data between other devices. Consumer market examples can be, for example; devices such as smart thermostat systems and washer/dryers that use Wi-Fi for remote monitoring, baby-cams, remote doorbell cams, etc.

To reiterate, as used herein, a connected IoT device refers to a mobile device, electronic system, machine, and/or any type of apparatus, system, that may be mobile, fixed, wearable, portable, integrated, cloud-based, distributed and/or any combination of these and which may be formed, manufactured, operated, etc. in any fashion, and/or manner in any location(s). It should be understood, however, that one or more of the embodiments described herein and/or in one or more specifications incorporated by reference may be applied to any device(s) or similar object(s) e.g., consumer devices, phones, phone systems, cell phones, cellular phones, mobile phone, smart phone, internet phones, wireless phones, personal digital assistants (PDAs), remote communication devices, wireless devices, music players, video players, media players, multimedia players, video recorders, VCRs, DVRs, book readers, voice recorders, voice controlled systems, voice controllers, cameras, social interaction devices, radios, TVs, watches, personal communication devices, electronic wallets, electronic currency, smart cards, smart credit cards, electronic money, electronic coins, electronic tokens, smart jewelry, electronic passports, electronic identification systems, biometric sensors, biometric systems, biometric devices, smart pens, smart rings, personal computers, tablets, laptop computers, scanners, printers, computers, web servers, media servers, multimedia servers, file servers, datacenter servers, database servers, database appliances, cloud servers, cloud devices, cloud appliances, embedded systems, embedded devices, electronic glasses, electronic goggles, electronic screens, displays, wearable displays, projectors, picture frames, touch screens, computer appliances, kitchen appliances, home appliances, home theater systems, audio systems, home control appliances, home control systems, irrigation systems, sprinkler systems, garage door systems, garage door controls, remote controls, remote control systems, thermostats, heating systems, air conditioning systems, ventilation systems, climate control systems, climate monitoring systems, industrial control systems, transportation systems and controls, industrial process and control systems, industrial controller systems, machine-to-machine systems, aviation systems, locomotive systems, power control systems, power controllers, lighting control, lights, lighting systems, solar system controllers, solar panels, vehicle and other engines, engine controllers, motors, motor controllers, navigation controls, navigation systems, navigation displays, sensors, sensor systems, transducers, transducer systems, computer input devices, device controllers, touchpads, mouse, pointer, joystick, keyboards, game controllers, haptic devices, game consoles, game boxes, network devices, routers, switches, TiVO, AppleTV, GoogleTV, internet TV boxes, internet systems, internet devices, set-top boxes, cable boxes, modems, cable modems, PCs, tablets, media boxes, streaming devices, entertainment centers, entertainment systems, aircraft entertainment systems, hotel entertainment systems, car and vehicle entertainment systems, GPS devices, GPS systems, automobile and other motor vehicle systems, truck systems, vehicle control systems, vehicle sensors, aircraft systems, automation systems, home automation systems, industrial automation systems, reservation systems, check-in terminals, ticket collection systems, admission systems, payment devices, payment systems, banking machines, cash points, ATMs, vending machines, vending systems, point of sale devices, coin-operated devices, token operated devices, gas (petrol) pumps, ticket machines, toll systems, barcode scanners, credit card scanners, travel token systems, travel card systems, RFID devices, electronic labels, electronic tags, tracking systems, electronic stickers, electronic price tags, near field communication (NFC) devices, wireless operated devices, wireless receivers, wireless transmitters, sensor devices, motes, sales terminals, checkout terminals, electronic toys, toy systems, gaming systems, information appliances, information and other kiosks, sales displays, sales devices, electronic menus, coupon systems, shop displays, street displays, electronic advertising systems, traffic control systems, traffic signs, parking systems, parking garage devices, elevators and elevator systems, building systems, mailboxes, electronic signs, video cameras, security systems, surveillance systems, electronic locks, electronic keys, electronic key fobs, access devices, access controls, electronic actuators, safety systems, smoke detectors, fire control systems, fire detection systems, locking devices, electronic safes, electronic doors, music devices, storage devices, back-up devices, USB keys, portable disks, exercise machines, sports equipment, medical devices, medical systems, personal medical devices, wearable medical devices, portable medical devices, mobile medical devices, blood pressure sensors, heart rate monitors, blood sugar monitors, vital sign monitors, ultrasound devices, medical imagers, drug delivery systems, drug monitoring systems, patient monitoring systems, medical records systems, industrial monitoring systems, robots, robotic devices, home robots, industrial robots, electric tools, power tools, construction equipment, electronic jewelry, wearable devices, wearable electronic devices, wearable cameras, wearable video cameras, wearable systems, electronic dispensing systems, handheld computing devices, handheld electronic devices, electronic clothing, combinations of these and/or any other devices, multi-function devices, multi-purpose devices, combination devices, cooperating devices, and the like, etc.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the stream(s) includes one or more stream). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In an embodiment, provided herein is a system implementing a moving target defense (MTD) against a malicious port scanning, spoofing attack replay attack, or their combination, the system comprising: an edge network switch communicatively coupled to a network; a backend management server in communication with a non-volatile memory having stored thereon a set of executable instructions, that, when executed by a processor, cause the processor to periodically randomize a temporarily valid port identifier, each port identifier associated with an internal port identifier; the processor communicatively coupled to the edge network switch and the backend management server; and a IoT gateway having a plurality of ports thereon in communication with the edge network switch, each port associated with a connected Internet of Things (IoT) device, wherein the instructions, when executed, further cause the processor to: via the edge network switch, receive a request for data from a connected device; select the temporarily randomized port identifier; and send the periodically randomized and temporarily valid port identifier to the request, wherein, (i) wherein the instructions, when executed by the processor, are further configured to periodically and temporarily generate a network address translation (NAT) table, comprising the port's number, the port's internal IP address, and the port's public source IP address, wherein (ii) wherein the malicious port scanning is a connect scan, and/or (iii) a half-open scan, wherein (iv) the connected IoT device is connected via local area network (LAN), wide area network (WAN), wireless local area network (WLAN), (v) a camera, a thermal sensor, a motion detector, an actuator, an autonomous vehicle, an industrial plant, farm machinery, ehealth, smart home, smart city, oil fields, drilling machines, or a combination of IoT devices comprising the foregoing, wherein (vi) the instructions, when executed by the processor upon authenticating the request, are further configured to encrypt data transmitted from the connected IoT device, (vii) are further configured to maintain on the non-volatile memory, a database of records concerning known connected IoT devices and the number of unsuccessful requests associated with each connected IoT device, (viii), when executed by the processor and depending on a predetermined upper threshold number of unsuccessful requests, are further configured to increase the frequency of randomizing the port identifier, and/or decrease the time the randomized port identifier is valid, and wherein (ix) when executed by the processor and depending on a predetermined lower threshold number of unsuccessful requests, are further configured to decrease the frequency of randomizing the port identifier, and/or increase the time the randomized port identifier is valid.

In another embodiment, provided herein is a method of providing secure network communication for plurality of connected internet of things (IoT) devices, the method implemented on a system comprising: an edge network switch communicatively coupled to a network; a backend management server in communication with a non-volatile memory having stored thereon a set of executable instructions, that, when executed by a processor, cause the processor to periodically randomize a temporarily valid port identifier, each temporarily valid port identifier associated with an internal port identifier and a port number; the processor communicatively coupled to the edge network switch and the backend management server; and a IoT gateway having a plurality of ports thereon in communication with the edge network switch, each port associated with a connected Internet of Things (IoT) device, wherein the instructions, when executed, further cause the processor to: via the edge network switch, receive a request for data from a connected device, select the randomized port identifier, and send the periodically randomized and temporarily valid port identifier to the request, the method comprising: using the backend management server, periodically generating a temporarily valid randomized identification for a port associated with a connected IoT device; and upon receiving authenticated communication request between a user and the connected device that specify the port associated with the connected IoT device, and using a temporarily valid scrambling key, encrypting the data communicated from the device to the user, wherein (x) the instructions, when executed by the processor, are further configured to maintain on the non-volatile memory, a database of records concerning known IoT devices, each record comprising at least a reputation score and a constraint profile, wherein (xi) the step of generating periodically randomized and temporarily valid port identifier comprises: using the backend management server, generating a first password; using the edge network switch, obtaining a second password; generating a time stamp; using the first password, the second password and the time stamp, generating a unique ID offset vector; applying the ID offset vector to a currently valid port identifier; and generating periodically randomized and temporarily valid port identifier, wherein (xii) the step of encrypting the data communicated from the device to the user is preceded by: generating a temporarily valid scrambling key; apply the scrambling key to the data; and sending the scrambling key to the request, wherein (xiii) the step of generating a temporarily valid scrambling key comprises: using the first password, the second password, the internal port ID, and the time stamp, generating the scrambling key, wherein (xiv) the instructions, when executed by the processor, are further configured to produce random network address translation (NAT) table associating public source IP addresses with ports numbers on the edge network switch, (xv) when executed by the processor, are further configured to maintain on the non-volatile memory, a database of records concerning known connected IoT devices and the number of unsuccessful authentications associated with each connected IoT device, (xvi) when executed by the processor and depending on a predetermined upper threshold number of unsuccessful requests, are further configured to increase the frequency of randomizing the port identifier, and/or decrease the time the randomized port identifier is valid, (xvii) when executed by the processor and depending on a predetermined lower threshold number of unsuccessful requests, are further configured to decrease the frequency of randomizing the port identifier, and/or increase the time the randomized port identifier is valid, wherein (xviii) wherein the step of encrypting the data is preceded by a step of authenticating the request originator, and wherein (xix) the step of authenticating comprises: providing the request originator network credentials; and providing the valid port identifier.

Although the foregoing disclosure has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A system implementing a moving target defense (MTD) against a malicious port scanning, spoofing attack replay attack, or their combination, the system comprising: an edge network switch communicatively coupled to a network; a backend management server in communication with a non-volatile memory having stored thereon a set of executable instructions, that, when executed by a processor, cause the processor to periodically randomize a temporarily valid port identifier, each temporarily valid and periodically randomized port identifier associated with an internal port identifier; the processor communicatively coupled to the edge network switch and the backend management server; and a Internet of Things (IoT) gateway having a plurality of ports thereon in communication with the edge network switch, each IoT gateway port associated with a corresponding connected IoT device, wherein the instructions, when executed, further cause the processor to:
   a. via the edge network switch, receive a request for data communication between the connected IoT device and a connected user device, wherein the request originator is the connected IoT device or the connected user device and wherein the request is received by the connected user device or the connected IoT device respectively;
   b. select the temporarily valid and periodically randomized port identifier;
   c. send the temporarily valid and periodically randomized port identifier to the request originator;
   d. maintain on the non-volatile memory, a database of records concerning known connected IoT devices and the number of unsuccessful requests associated with each connected IoT device; and
   e. depending on a predetermined upper threshold number of unsuccessful requests, increase the frequency of randomizing the temporarily valid and periodically randomized port identifier, and/or decrease the time the temporarily randomized port identifier is valid.

2. The system of claim 1, wherein the instructions, when executed by the processor, are further configured to periodically and temporarily generate a network address translation (NAT) table, comprising the port's number, the port's internal IP address, and the port's public source IP address.

3. The system of claim 1, wherein the malicious port scanning is a connect scan.

4. The system of claim 1, wherein the malicious port scanning is a half-open scan.

5. The system of claim 1, wherein the connected IoT device is connected via local area network (LAN), wide area network (WAN), wireless local area network (WLAN).

6. The system of claim 5, wherein the connected IoT device is a camera, a thermal sensor, a motion detector, an actuator, an autonomous vehicle, an industrial plant, farm machinery, ehealth, smart home, smart city, oil fields, drilling machines, or a combination of IoT devices comprising the foregoing.

7. The system of claim 2, wherein the instructions, when executed by the processor upon authenticating the request, are further configured to encrypt data transmitted from the connected IoT device.

8. The system of claim 1, wherein the instructions, when executed by the processor and depending on a predetermined lower threshold number of unsuccessful requests, are further configured to decrease the frequency of randomizing the periodically randomized and temporarily valid port identifier, and/or increase the time the periodically randomized and temporarily valid port identifier is valid.

9. A method of providing secure network communication for a plurality of connected internet of things (IoT) devices, the method implemented on a system comprising: an edge network switch communicatively coupled to a network; a backend management server in communication with a non-volatile memory having stored thereon a set of executable instructions, that, when executed by a processor, cause the processor to periodically randomize a temporarily valid port identifier, each temporarily valid and periodically randomized port identifier associated with an internal port identifier and a port number; the processor communicatively coupled to the edge network switch and the backend management server; and a IoT gateway having a plurality of ports thereon in communication with the edge network switch, each port on the IoT gateway associated with a corresponding connected IoT device, wherein the instructions, when executed, further cause the processor to: via the edge network switch, receive a request for data communication between the connected IoT device and a connected user device, wherein the request originator is the connected IoT device, or the connected user device and wherein the request is received by the connected user device or the connected IoT device respectively, select the temporarily valid and periodically randomized port identifier, and send the temporarily valid and periodically randomized port identifier to the request originator, the method comprising:
  a. using the backend management server, periodically generating a temporarily valid randomized identification for the IoT gateway port associated with the corresponding connected IoT device; and
  b. upon receiving authenticated communication request from a request originator via the edge network switch, that specifies the port associated with the connected IoT device, and using a temporarily valid scrambling key, encrypting the data communicated from the connected IoT device to the connected user device.

10. The method of claim 9, wherein the instructions, when executed by the processor, are further configured to maintain on the non-volatile memory, a database of records concerning known IoT devices, each record comprising at least a reputation score and a constraint profile.

11. The method of claim 9, wherein the step of generating periodically randomized and temporarily valid port identifier comprises:
  a. using the backend management server, generating a first password;
  b. using the edge network switch, obtaining a second password;
  c. generating a time stamp;
  d. using the first password, the second password and the time stamp, generating a unique ID offset vector;
  e. applying the ID offset vector to a currently valid port identifier; and
  f. generating periodically randomized and temporarily valid port identifier.

12. The method of claim 11, wherein the step of encrypting the data communicated from the connected IoT device to the connected user device is preceded by:
  a. generating a temporarily valid scrambling key;
  b. applying the scrambling key to the communicated data; and
  c. sending the temporary port identification to the request originator.

13. The method of claim 12, wherein the step of generating a temporarily valid scrambling key comprises: using the first password, the second password, the internal port ID, and the time stamp, generating the scrambling key.

14. The method of claim 9, wherein the instructions, when executed by the processor, are further configured to produce random network address translation (NAT) table associating public source IP addresses with ports numbers on the edge network switch.

15. The method of claim 9, wherein the instructions, when executed by the processor, are further configured to maintain on the non-volatile memory, a database of records concerning known connected IoT devices and the number of unsuccessful authentications associated with each known connected IoT device.

16. The method of claim 15, wherein the instructions, when executed by the processor and depending on a predetermined upper threshold number of unsuccessful requests, are further configured to increase the frequency of randomizing the periodically randomized and temporarily valid port identifier, and/or decrease the time the periodically randomized and temporarily valid port identifier is valid.

17. The method of claim 15, wherein the instructions, when executed by the processor and depending on a predetermined lower threshold number of unsuccessful requests, are further configured to decrease the frequency of randomizing the periodically randomized and temporarily valid port identifier, and/or increase the time the periodically randomized and temporarily valid port identifier is valid.

18. The method of claim 9, wherein the step of encrypting the data is preceded by a step of authenticating the request originator.

19. The method of claim 18, wherein the step of authenticating comprises:
  a. providing the request originator's network credentials; and
  b. providing the periodically randomized and temporarily valid port identifier.

* * * * *